(12) United States Patent
Wang et al.

(10) Patent No.: US 12,130,846 B2
(45) Date of Patent: Oct. 29, 2024

(54) INFORMATION PROCESSING METHOD, APPARATUS, ELECTRONIC DEVICE AND COMPUTER READABLE STORAGE MEDIUM

(71) Applicant: Samsung Electronics Co., Ltd., Suwon-si (KR)

(72) Inventors: Huadong Wang, Beijing (CN); Song Liu, Beijing (CN); Yuntao Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/604,609

(22) PCT Filed: Apr. 20, 2020

(86) PCT No.: PCT/KR2020/005232
§ 371 (c)(1),
(2) Date: Oct. 18, 2021

(87) PCT Pub. No.: WO2020/214011
PCT Pub. Date: Oct. 22, 2020

(65) Prior Publication Data
US 2022/0179888 A1    Jun. 9, 2022

(30) Foreign Application Priority Data

Apr. 19, 2019  (CN) .......................... 201910319841.1

(51) Int. Cl.
*G06F 16/332*    (2019.01)
*G06F 16/335*    (2019.01)
(Continued)

(52) U.S. Cl.
CPC ........ *G06F 16/3329* (2019.01); *G06F 16/335* (2019.01); *G06F 16/338* (2019.01); *G06F 40/35* (2020.01); *H04L 51/02* (2013.01)

(58) Field of Classification Search
CPC .................................................. G06F 16/3329
See application file for complete search history.

(56) References Cited

U.S. PATENT DOCUMENTS 7,505,892 B2    3/2009  Foderaro
9,812,151 B1 *  11/2017 Amini ..................... G06T 13/40
(Continued)

FOREIGN PATENT DOCUMENTS

KR    10-2010-0128068 A    12/2010
KR    10-2016-0147303 A    12/2016
(Continued)

*Primary Examiner* — Van H Oberly
(74) *Attorney, Agent, or Firm* — Jefferson IP Law, LLP

(57) ABSTRACT

Embodiments of the present disclosure provide an information processing method, apparatus, electronic device, and computer readable storage medium, and relate to the field of natural language processing technologies. The method includes: obtaining attribute information currently corresponding to an information responding party based on current input of a user, and then determining the information to be responded corresponding to the current input of the user, and then generating and outputting a target response based on the attribute information currently corresponding to the information responding party and the information to be responded corresponding to the current input of the user. The embodiments of the present disclosure realize that the target response is outputted more accurately when an information responding party (for example, an intelligent chatbot) interacts with the user, so as to implement the dialogue with the user.

20 Claims, 36 Drawing Sheets

(51) Int. Cl.
 *G06F 16/338* (2019.01)
 *G06F 40/35* (2020.01)
 *H04L 51/02* (2022.01)

(56) References Cited

U.S. PATENT DOCUMENTS

| | | |
|---|---|---|
| 9,847,084 B2 | 12/2017 | Gustafson et al. |
| 2015/0052084 A1* | 2/2015 | Kolluru .................. G06T 13/40 |
| | | 706/11 |
| 2016/0300570 A1* | 10/2016 | Gustafson ............... G10L 25/51 |
| 2016/0379106 A1 | 12/2016 | Qi et al. |
| 2018/0189793 A1* | 7/2018 | Campos ................ H04L 51/214 |
| 2021/0004538 A1 | 1/2021 | Jang et al. |

FOREIGN PATENT DOCUMENTS

| | | |
|---|---|---|
| KR | 10-1891492 B1 | 8/2018 |
| KR | 10-2019-0002067 A | 1/2019 |

* cited by examiner

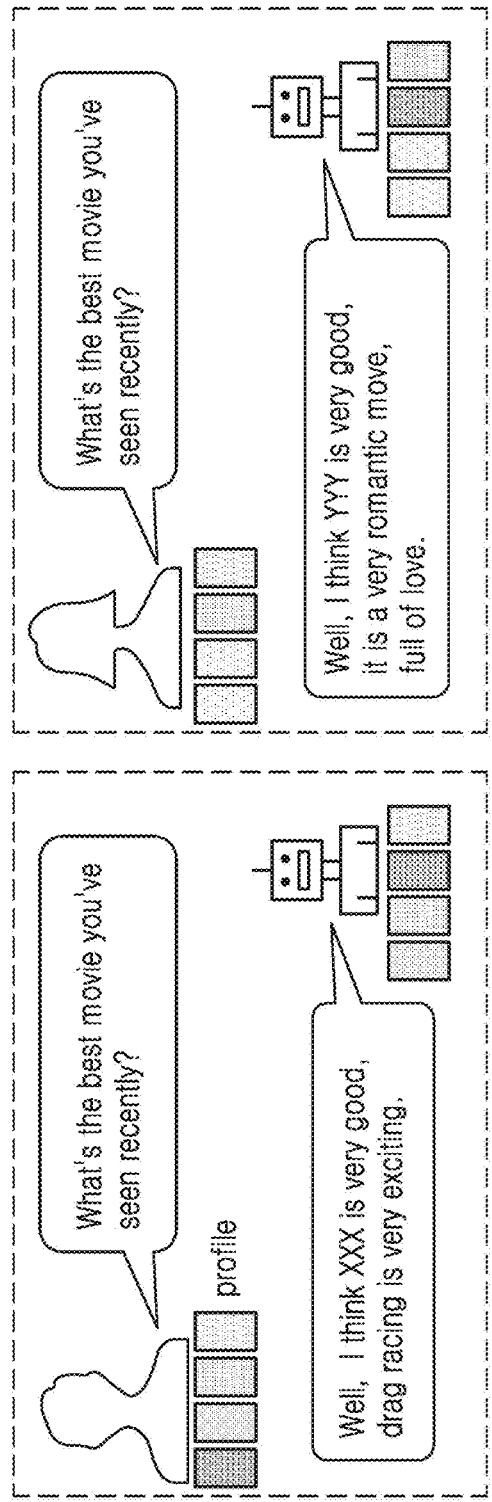

INFORMATION PROCESSING METHOD, APPARATUS, ELECTRONIC DEVICE AND COMPUTER READABLE STORAGE MEDIUM

TECHNICAL FIELD

The present disclosure relates to the field of natural language processing technologies, and in particular, to an information processing method, apparatus, electronic device, and computer readable storage medium.

BACKGROUND ART

With the development of information technology, the intelligent chatbot has emerged, and the intelligent chatbot may be widely used in multi-modal interactions. For example, the intelligent chatbot may directly talk to users, or the intelligent chatbot may receive questions input by the user and search for answers that matches the questions from a knowledge base and output them to the user.

During the information interaction between the intelligent chatbot and the user, the intelligent chatbot, when receiving the input information of the user, performs intent understanding on the information input by the user, and generates a target response for the output to the user. Therefore, when applying the intelligent chatbot to the interaction with a user, how to personally and more accurately generate a target response and output it to the user becomes a key issue.

DISCLOSURE OF INVENTION

Solution to Problem

An information processing method and apparatus are provided. the method may include obtaining attribute information currently corresponding to an information responding party based on a current input of a user, determining information to be responded corresponding to the current input of the user, and generating and outputting a target response based on the attribute information currently corresponding to the information responding party and the information to be responded corresponding to the current input of the user.

BRIEF DESCRIPTION OF DRAWINGS

In order to more clearly illustrate the technical solutions in the embodiments of the present disclosure, the drawings used in the description of the embodiments of the present disclosure will be briefly described below.

FIG. 1E is a schematic diagram of another chat scene dialogue about profile information according to embodiments of the present disclosure;

BEST MODE FOR CARRYING OUT THE INVENTION

Figure 1A:
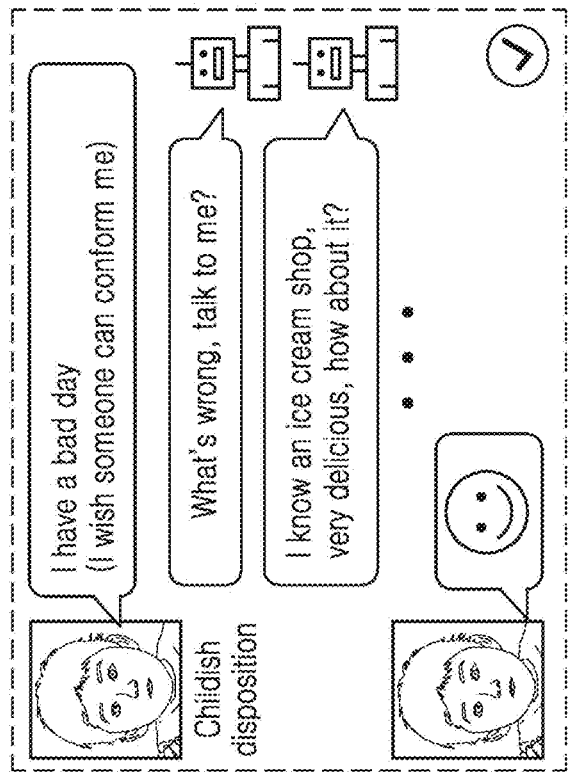
FIG. 1A is a schematic diagram of a chat scene dialogue about personality information according to embodiments of the present disclosure.
Figure 1A:
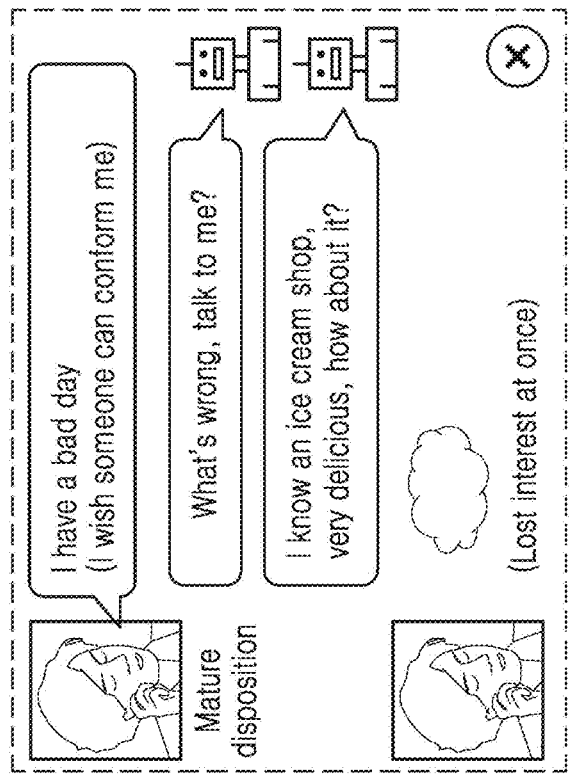

The present disclosure provides an information processing method, apparatus, electronic device, and computer readable storage medium for solving the problem of how to output response information more accurately when the intelligent chatbot is applied to the interaction with a user, the technical solutions are shown in the following:

In a first aspect, an information processing method is provided, the method including:

obtaining attribute information currently corresponding to an information responding party based on a current input of a user;

determining information to be responded corresponding to the current input of the user;

generating and outputting a target response based on the attribute information currently corresponding to the information responding party and the information to be responded corresponding to the current input of the user.

In a second aspect, an information processing apparatus is provided, the apparatus including:

a first obtaining module, configured to obtain attribute information currently corresponding to an information responding party according to a current input of a user;

a determining module, configured to determine information to be responded corresponding to the current input of the user;

a first generating and outputting module, configured to generate and output a target response based on the attribute information currently corresponding to the information responding party obtained by the first obtaining module and the information to be responded corresponding to the current input of the user determined by the determining module.

In a third aspect, an electronic device is provided, the electronic device including:

one or more processors;
a memory;
one or more programs, wherein the one or more programs are stored in the memory and configured to be executed by the one or more processors, and the one or more programs are configured to execute the information processing method shown according to the first aspect.

In a fourth aspect, an information processing apparatus is provided, including:

a memory configured to store one or more instructions; and at least one processor configured to execute the one or more instructions stored in the memory to:

obtain attribute information currently corresponding to an information responding party based on a current input of a user, determine information to be responded corresponding to the current input of the user, and generate and output a target response based on the attribute information currently corresponding to the information responding party and the information to be responded corresponding to the current input of the user.

In a fifth aspect, a computer readable storage medium is provided, wherein the storage medium stores at least one instruction, at least one program, a code set or an instruction set, the at least one instruction, the at least one program, the code set or the instruction set being loaded and executed by the processor to implement the information processing method shown according to the first aspect.

In a sixth aspect, an information processing method is provided, the method including:

obtaining a current input of a user;

generating and outputting target response information based on the current input of the user and historical interaction information.

In a seventh aspect, an information processing apparatus is provided, the apparatus including:

a second obtaining module, configured to obtain a current input of a user;

a second generating and outputting module, configured to generate and output target response information based on the current input of the user and historical interaction information.

In a eighth aspect, an electronic device is provided, including:

one or more processors;
a memory;
one or more programs, wherein the one or more programs are stored in the memory and configured to be executed by the one or more processors, and the one or more programs are configured to execute the information processing method shown according to the sixth aspect.

In an ninth aspect, a computer readable storage medium is provided, wherein the storage medium stores at least one instruction, at least one program, a code set or an instruction set, the at least one instruction, the at least one program, the code set or the instruction set being loaded and executed by the processor to implement the information processing method shown in the sixth aspect.

The beneficial effects brought by the technical solutions provided by the present disclosure are:

The present disclosure provides an information processing method, apparatus, electronic device, and computer readable storage medium. Compared with the prior art, the present disclosure obtains attribute information currently corresponding to the information responding party according to the current input of the user, and then determines the information to be responded corresponding to the current input of the user, then generates and outputs the target response based on the attribute information currently corresponding to the information responding party and the information to be responded corresponding to the current input of the user. In other words, the target response outputted in the present disclosure is generated based on the attribute information currently corresponding to the information responding party, and the attribute information currently corresponding to the information responding party is determined based on the current input of the user, thereby improving the accuracy of the target response information output by the information responding party (including an intelligent chatbot), and improving the user experience.

The present disclosure provides an information processing method, apparatus, electronic device, and computer readable storage medium. Compared with the prior art, the present disclosure obtains the current input of the user, and then generates and outputs target response information based on the current input of the user and the historical knowledge information during the interaction between the user and the information responding party. In other words, the target response information outputted in the present disclosure is generated based on the current input information of the user and the historical knowledge information during the interaction between the user and the information responding party, and is not only generated according to the current input of the user, thereby improving the accuracy of the target response information output by the information responding party (including an intelligent chatbot), and improving the user experience.

Mode for the Invention

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

In order to make the objects, technical solutions and advantages of the present disclosure more clear, the embodiments of the present disclosure will be further described in detail below with reference to the accompanying drawings.

Artificial intelligence-related functions according to the disclosure are operated through a processor and a memory. A processor may include one or a plurality of processors. In this case, the one or the plurality of processors may each be a general purpose processor, such as a CPU, an AP, and a digital signal processor (DSP), a graphics dedicated processor, such as a GPU and a vision processing unit (VPU), or an artificial intelligence dedicated processor, such as an NPU. The one or the plurality of processors control to process input data according to a predefined operation rule or an AI model stored in a memory. Alternatively, when the one or the plurality of processors are artificial intelligence dedicated processors, the artificial intelligence dedicated processors may be designed to have a hardware structure specialized for processing a specific AI model.

The predefined operation rule or the AI model may be constructed through learning. Here, construction through learning means that, as a basic AI model is trained by using a plurality of pieces of learning data according to a learning algorithm, a predefined operation rule or an AI model that is set to perform a desired characteristic (or purpose) is constructed. Such learning may be performed in a device in which an AI according to the disclosure is executed or may be performed through a separate server and/or a system. Examples of learning algorithms include supervised learning, unsupervised learning, semi-supervised learning, or reinforcement learning, but are not limited to the above examples.

An AI model may include a plurality of neural network layers. Each of the plurality of neural network layers has a plurality of weight values, and a neural network operation is performed through operations between an operation result of the previous layer and the plurality of weight values. The weight values of the neural network layers may be optimized through learning results of the AI model. For example, the plurality of weight values may be renewed such that a loss value or a cost value obtained by an AI model is during a learning process is reduced or minimized. Artificial neural networks may include a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-networks, but are not limited to the above examples.

Hereinafter, the disclosure will be described in detail with reference to the accompanying drawings.

With the development of artificial intelligence, an intelligent chatbot (which can be referred to as a chatbot) has emerged, and the chatbot may talk to the user, including chatting with the user and intelligent question-answering. Nowadays more and more users hope that chatbots may have a personalized dialogue with them. There are many chatbots now, but these chatbots have many defects:

1) The personality and emotion of the chatbot in the prior art are predefined and fixed in dialogue;

For example, in the dialogue scene shown in FIG. 1A, the two dialogue scenes show that a mature adult and a childish (immature personality) child respectively talk to a chatbot when they are in a bad mood, but the chatbot generates a target response to talk to the two persons through a same personality (pre-defined personality). Obviously, this method is not suitable for people with mature personality, because it prefers to listen, which resulting in the lower accuracy of the dialogue of the chatbot with the user, accordingly, thereby resulting in a poor user experience.

Figure 1B:
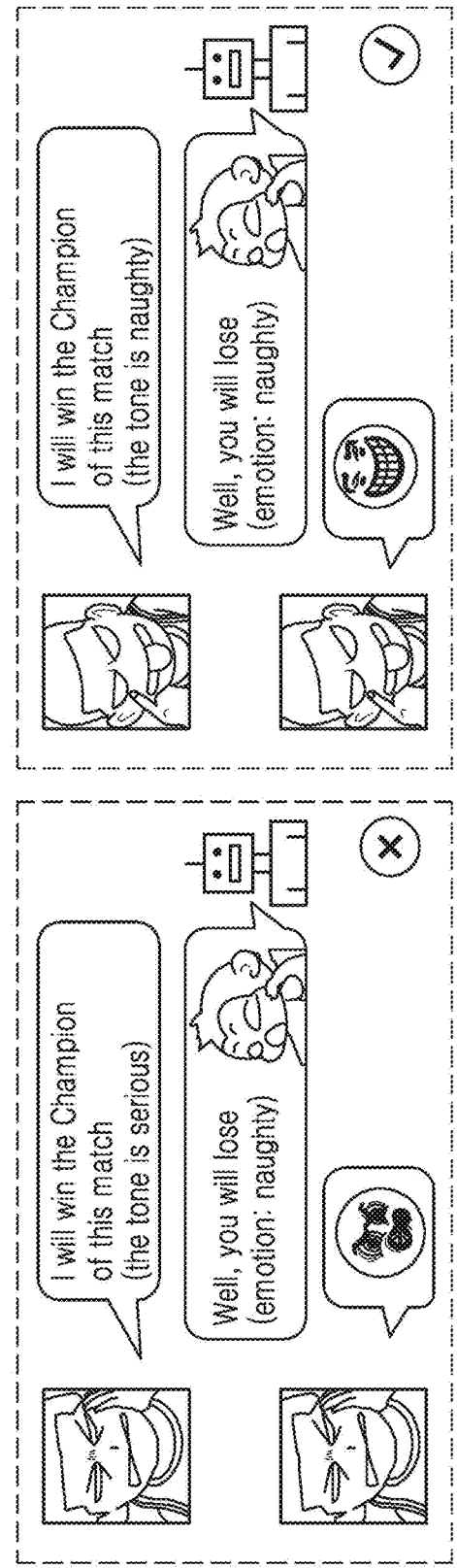
FIG. 1B is a schematic diagram of a chat scene dialogue about emotion information according to embodiments of the present disclosure.

For example, in the dialogue scene shown in FIG. 1B, when the user said to the chatbot with serious and happy emotions (tone), "I will definitely win the champion tomorrow", at this time, the chatbot responds "You will definitely lose" in a predefined emotion (a naughty tone). Obviously, when the user talks to the chatbot in a serious tone, the chatbot's response is inappropriate, and the user will be angry and lose interest in chatting.

In the above two dialogue scenes, when different users talk to the chatbot through different personalities, or the same user interacts with the chatbot through different emotions, the chatbot generates a target responses through predefined personalities or predefined emotions to implement a dialogue with the user, thus resulting in the low accuracy of the chatbot's dialogue with the user, accordingly, resulting in the poor user experience in the dialogue with the chatbot.

2) In the prior art, when personalizing a chatbot, only the profile information of the user is considered, and the profile information that the chatbot itself should have is ignored.

Figure 1C:
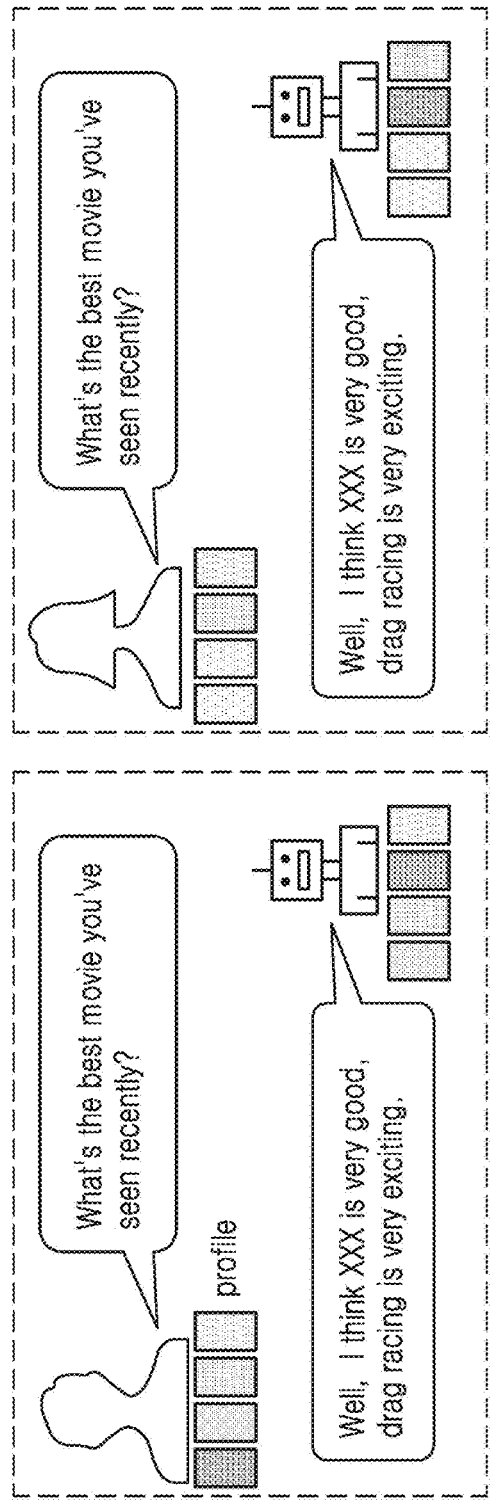
FIG. 1C is a schematic diagram of a chat scene dialogue about profile information according to embodiments of the present disclosure.

For example, the user hopes a chatbot to have similar preferences with himself. In the two dialogue scenes shown in FIG. 1C, the boys and girls respectively talk to the chatbot with the same question "What's the best movie you've seen recently?". Generally, a boy prefers action movies while a girl prefers emotional and romantic movies. However, the profile information of the chatbot itself is not considered in the prior art. The chatbot may all respond as "Well, I think "XXX" is very good, and the drag racing is too exciting", which resulting in a lower accuracy of the chatbot's dialogue with the user, accordingly, resulting in a poor user experience in the user's dialogue with the chatbot.

Figure 1D:
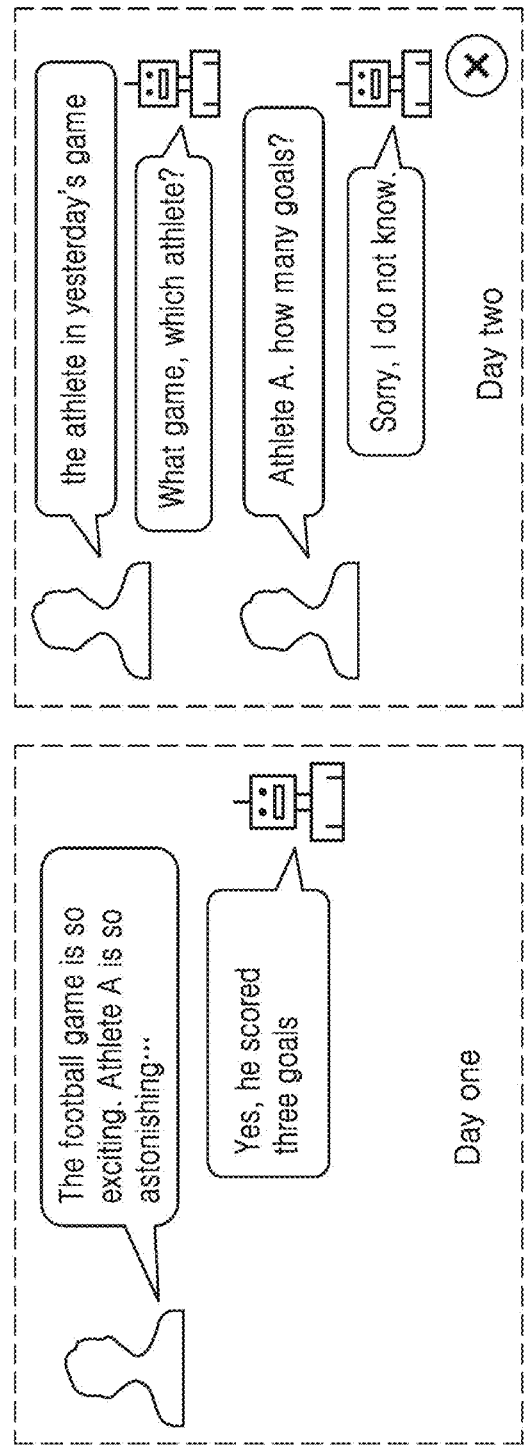
FIG. 1D is a schematic diagram of a chat scene dialogue about historical interaction information according to embodiments of the present disclosure.

3) A chatbot does not have the ability of long-term memory, and during the dialogue cannot fully utilize the long-term historical information of the dialogue to talk with the user;

For example, as shown in FIG. 1d, when the user talks with a chatbot on the first day, mentions a football match, and wants to continue talking with the chatbot about the football game the next day, but the chatbot has no context information about yesterday's chat, thereby resulting that the chatbot cannot give an accurate response, accordingly, resulting in a poor user experience;

4) For a task-type chatbot, for example, a MusicBot in the music field, DoctorBot in the medical field, FoodBot in the food field, and TelecomBot in the e-commerce field, the dialogue mode is fixed and single, and the number of sustainable dialogue is generally small. Furthermore, it is not able to conduct emotional and personalized dialogues with users, and the flexibility is poor;

5) The prior art does not consider how to make a chatbot constantly self-improve and grow in the dialogue with users.

In order to solve the technical problems in the prior art, the present disclosure proposes the following solutions:

1) To create a chatbot that can have a variety of different attribute information (personality, emotion, profile). In the dialogue with the user, the chatbot first recognizes the user's personality, emotion, user profile, etc., and selects the personality, emotion and profile information of the chat object that the user most likely likes, and chats with the user;

2) The chatbot system of the embodiments of the present disclosure considers the personalized features of the user (attribute information) and the personalized features of the chatbot, mainly including personality, emotion, profile, individual knowledge information, etc., and designs a joint feature learning method based on deep learning network;

For example, taking profile information as an example, the chatbot may consider the user profile when generating the target response. In the two dialogue scenes shown in FIG. 1E, a boy and girl respectively talk to the chatbot with the question "What's the best movie you've seen recently?". Generally, the boy prefers action movies while the girl prefers emotional and romantic movies. For a male user, the chatbot responds "Well, I think XXX is very good, and the drag racing is very exciting" while for a female user, the chatbot responds "Well, I think YYY is very good, it is a very romantic movie, full of love", which improve the accuracy of the chatbot's response and enhance the user experience.

3) The present disclosure introduces an individual knowledge base, extracts key knowledge information in the dialogue text during the dialogue and store it in the individual knowledge base to realize the memory of long-term historical information; a chatbot may search for context information from the individual knowledge base during the dialogue with the user, and generates and outputs response information;

4) The present disclosure constructs a personalized database and a group database to obtain chatbot attribute information that is preferred by the user through the personalized database and the group database:

Wherein, the personalized database may include: a user database and a chatbot database, and the user database and the chatbot database both include: a personality database, an emotion database, and a profile database.

Wherein, the personality database in the user database is used to store the personality information of the user, the emotion database in the user database is used to store the user's emotion information, the profile database in the user database is used to store the user's profile information, and the personality database in the chatbot database is used to store the personality information possessed by the chatbot; the emotion database in the chatbot database is used to store the emotion information possessed by the chatbot, and the profile database in the chatbot database is used to store the profile information possessed by the chatbot.

Figure 19A:
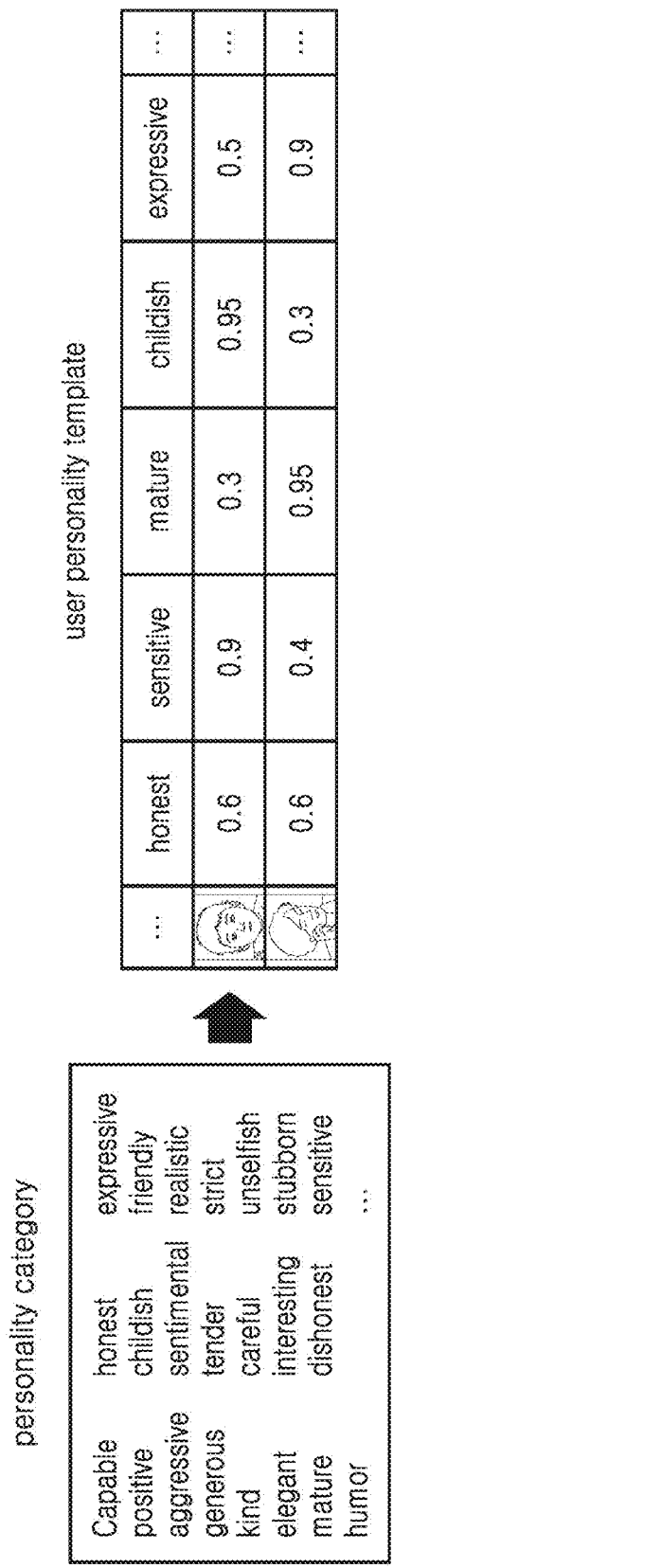
FIG. 19A is a schematic diagram of a user personality type and a user personality template in the embodiment of the present disclosure.
Figure 19B:
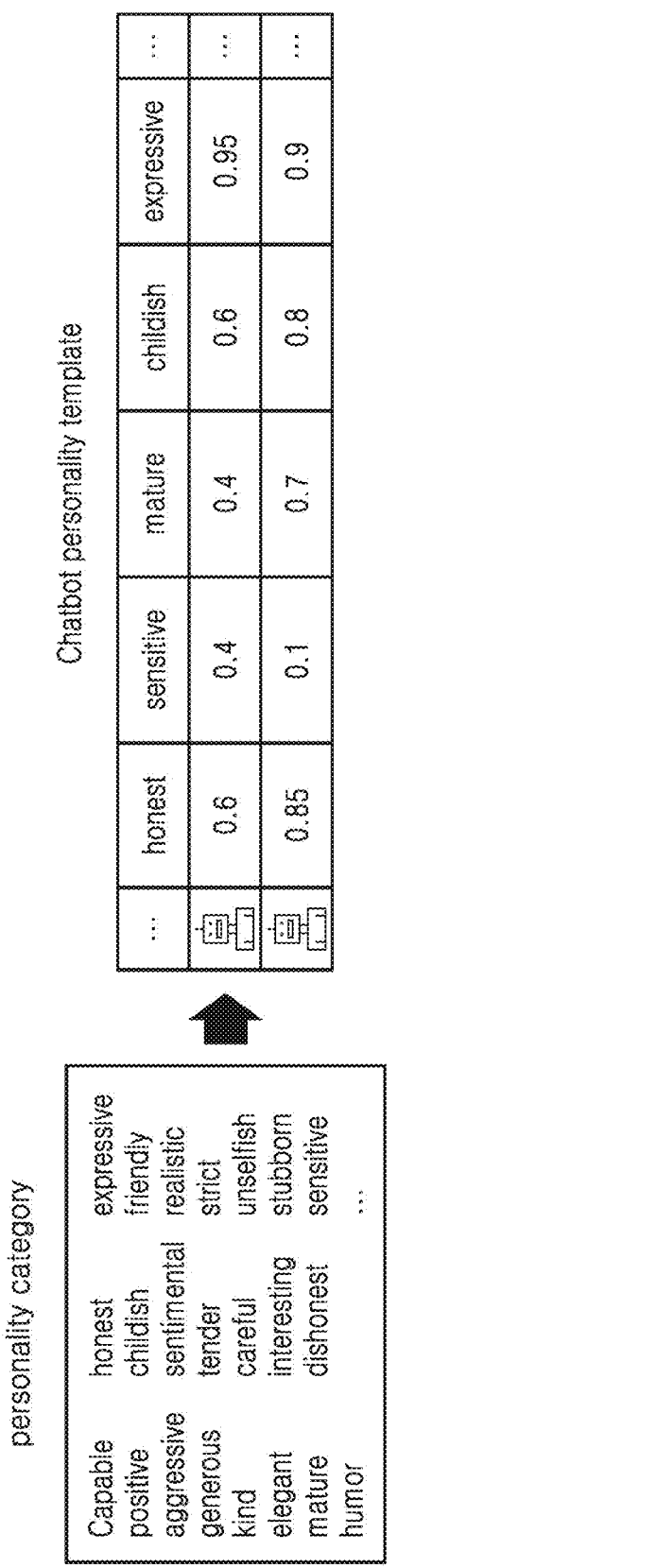
FIG. 19B is a schematic diagram of a chatbot personality type and a chatbot personality template in an embodiment of the present disclosure.

Wherein, both the construction of the personality database in the user database and the construction of the personality database in the chatbot database needs to define a personality database template which is composed of relevant personality categories to form a coordinate base of the personality database. A set of personality categories may be summarized based on behavioral psychology. The personality database in the user database and the personality database in the chatbot database use the same personality database template. Wherein, the personality database template in the user database is shown in FIG. 19A, and the personality database in the chatbot database is shown in FIG. 19B.

Figure 20A:
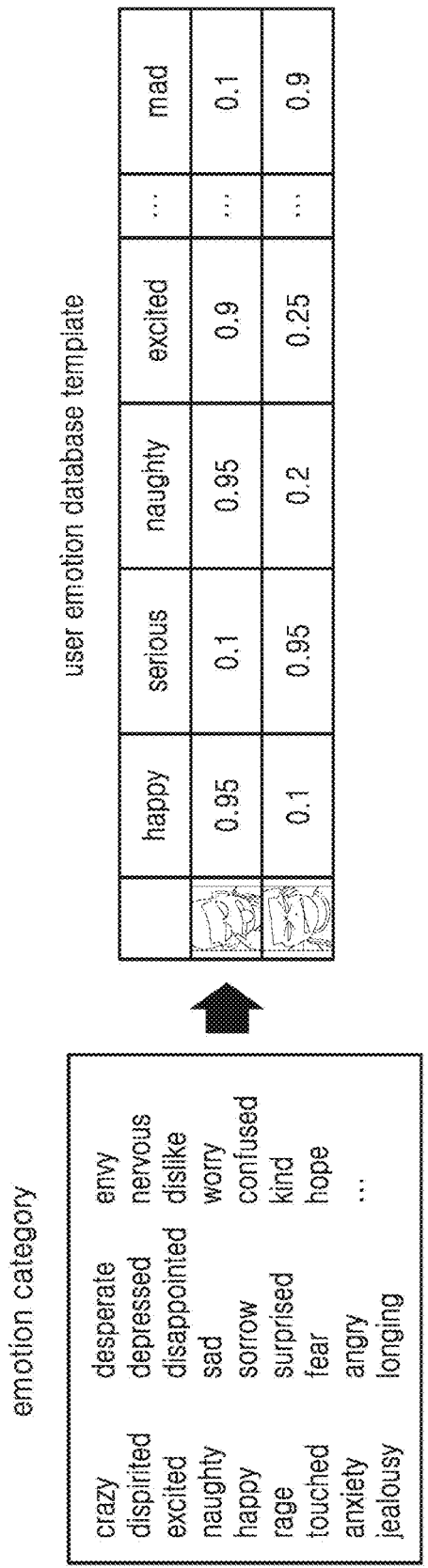
FIG. 20A is a schematic diagram of a user emotion type and a user emotion template in an embodiment of the present disclosure.
Figure 20B:
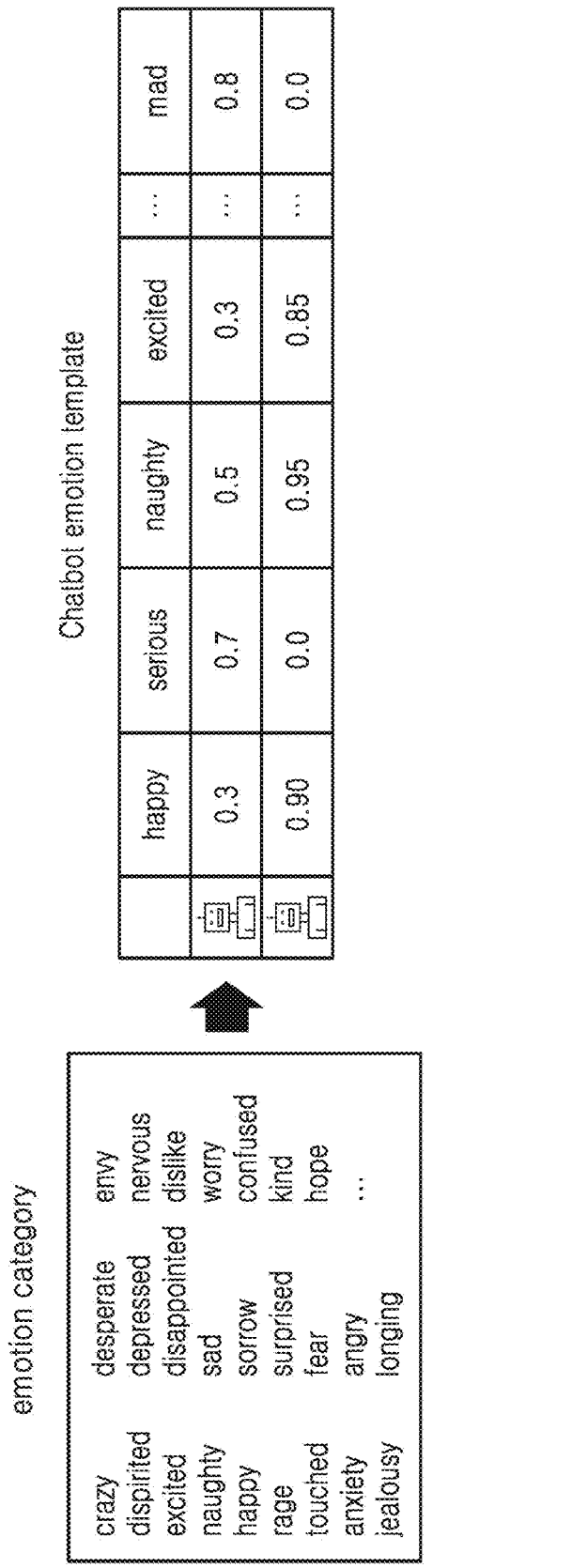
FIG. 20b is a schematic diagram of a chatbot emotion type and a chatbot emotion template in an embodiment of the present disclosure.

Wherein, the construction of the emotion database in the user database and the construction of the emotion database in the chatbot database needs to define an emotion database template which is composed of relevant emotion categories to form a coordinate base of the emotion database. A set of emotion categories may be summarized based on behavioral psychology. The emotion database in the user database and the emotion database in the chatbot database use the same emotion database template. Wherein, the emotion database template in the user database is shown in FIG. 20A, and the emotion database in the chatbot database is shown in FIG. 20b.

Figure 21A:
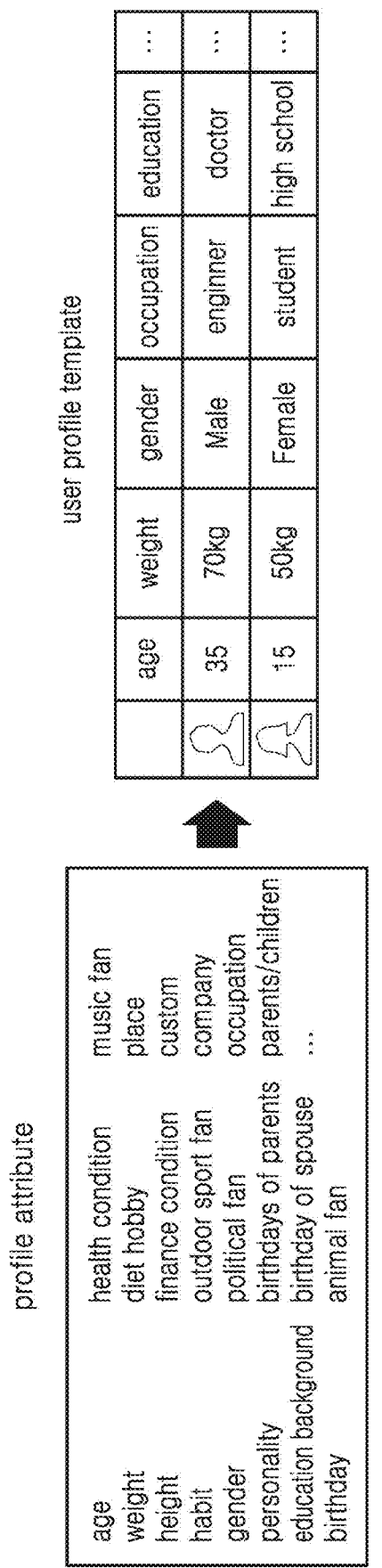
FIG. 21A is a schematic diagram of a user profile attribute and a user profile template in an embodiment of the present disclosure.
Figure 21B:
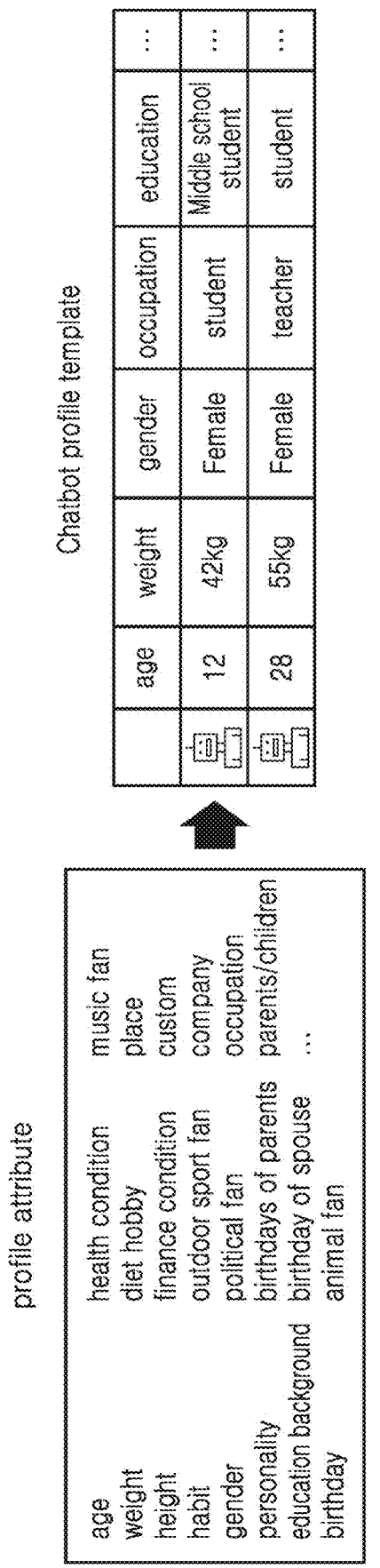
FIG. 21B is a schematic diagram of a chatbot profile attribute and a chatbot profile template in an embodiment of the present disclosure.

Wherein, the construction of the profile database in the user database and the construction of the profile database in the chatbot database needs to define a profile database template which is composed of relevant profile categories to form a coordinate base of the profile database. A set of profile categories may be summarized based on behavioral psychology. The profile database in the user database and the profile database in the chatbot database use the same profile database template. Wherein, the profile database template in the user database is shown in FIG. 21A, and the profile database in the chatbot database is shown in FIG. 21B.

5) The present disclosure proposes a positively growing personalized chatbot. By realizing the personalization and positively growing of the chatbot by updating the personalized database and individual knowledge base in the dialogue, a database updating method based on deep learning and hierarchical reinforcement learning is provided.

Wherein, the personalized database may include: a user database and a chatbot database, wherein the user database and the chatbot database both include: a personality database, an emotion database, and a profile database.

Wherein, the personality database in the user database is used to store the personality information of the user, the emotion database in the user database is used to store the user's emotion information, the profile database in the user database is used to store the user's profile information, and the personality database in the chatbot database is used to store the personality information of the chatbot; the personality database in the chatbot database is used to store the personality information possessed by the chatbot, and the profile database in the chatbot database is used to store the profile information possessed by the chatbot.

For the embodiments of the present disclosure, the personality of the same user during the dialogue may be fixed, but the emotion of the same user during the dialogue may change.

For example, the personality may include: mature personality, sensitive personality, and stubborn personality; the emotion may include: happy emotion, excited emotion, and naughty emotion.

For the embodiments of the present disclosure, the profile information may include features such as social attribute, living habit, and personal preferences.

For example, the profile information includes at least one of the following: gender, age, weight, height, place of birth, occupation, education background, and hobby.

Figure 2A:
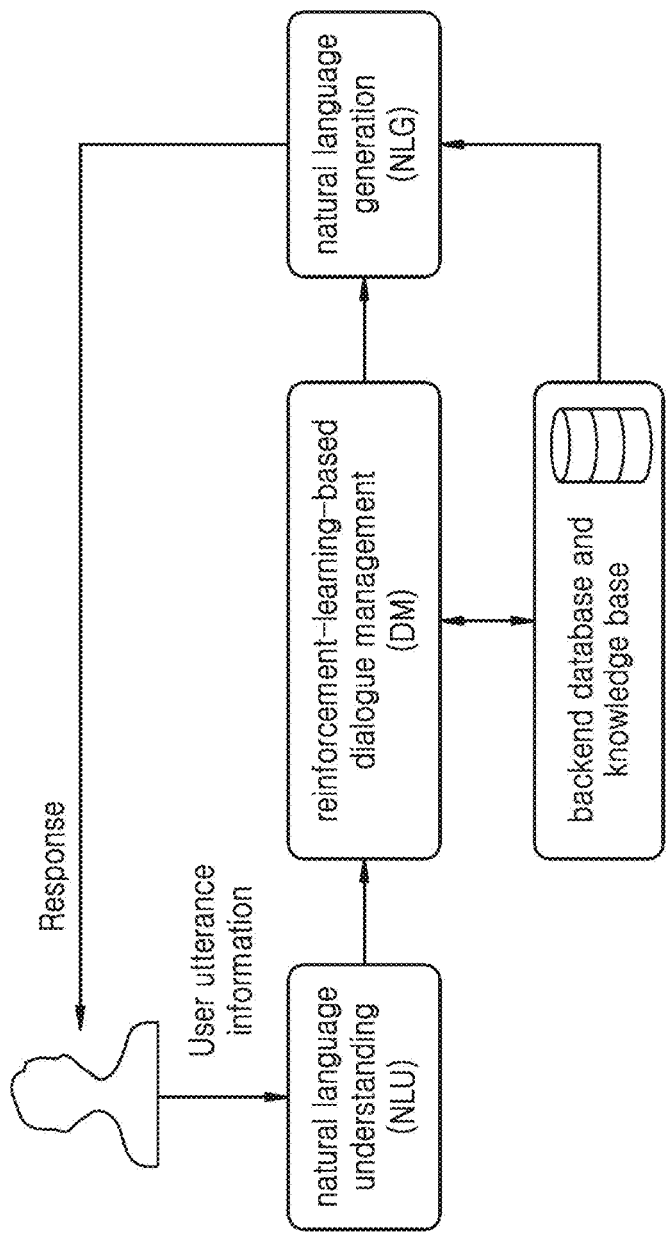
FIG. 2A is a schematic structural diagram of an actively growing chatbot provided by an embodiment of the present disclosure.

On the basis of the above solutions, the embodiments of the present disclosure provide an active growing chatbot architecture, which is used to implement a method for generating and outputting a target response during a chatbot's dialogue with the user:

Wherein, as shown in FIG. 2A, the architecture mainly includes the following four basic modules, wherein:
- a Natural Language Understanding (NLU), mainly used for dialogue information extraction and user intent recognition of dialogue;
- a Dialog Management (DM) which is the central component of the entire system, including Dialogue State Tracker (DST), Dialogue Policy, and database policies.
  1) Dialogue State Tracking (DST), which records the intermediate state of the information obtained by the system from the NLU module, such as the user intent category (Intent), the distribution variation of the reliability value of Slot filling, the representation of the dialogue history background, and the representation of current utterance, etc., used for generation of Dialogue policy and database update policy; for example, "eat at XXX", the intent here is "Food", the Slot filling is Adress="XXX", wherein the Adress is called slot and "XXX" is the value of the slot, the Slot filling mainly refers to the entity information extraction of the input text. DST records Food (Adress="XXX"), p=0.8, wherein p refers to the reliability of the information, and may be understood as a prediction probability. This value is continuously updated and determined as the dialogue continues.
  2) Dialogue policy, that is, to generate a probability distribution P(a|s) of all possible responses, wherein s is the current input state (including DST information and chatbot personalized attribute information), and state a is also called action, which is expressed as a possible response generated. Since the response may be a sentence of any length, the state space of a is infinite;
  3) DB Policy, including four policies: (1) user database update policy to determine whether it is necessary to update the user database; (2) chatbot database update policy to determine whether it is necessary to update the chatbot database; (3) group database obtaining policy to determine whether it is necessary to obtain chatbot attribute information from the group database so as to update the chatbot database; (4) individual knowledge base update policy to determine whether it is necessary to update an individual knowledge base, wherein the individual knowledge is the knowledge extraction from the NLU for the entire dialogue input.
- a backend database and knowledge base, including individual database, group database, and open knowledge bases. The chatbot needs to interact with the open database to obtain real-world knowledge.
- a Natural Language Generation (NLG), which generates responses according to dialogue context information, individual database, and knowledge base.

Wherein, the NLU obtains the user utterance information input by the user, and inputs the information after the natural language understanding into the DM module. The DM module performs the information interaction through the backend database and the knowledge base module, and inputs the processing result to the natural language generation (NLG) module. Based on the processing result of the DM, and the information of the backend database and the knowledge base, the NLG generates the response information for the user utterance information input by the user, and outputs it to the user.

Figure 2B:
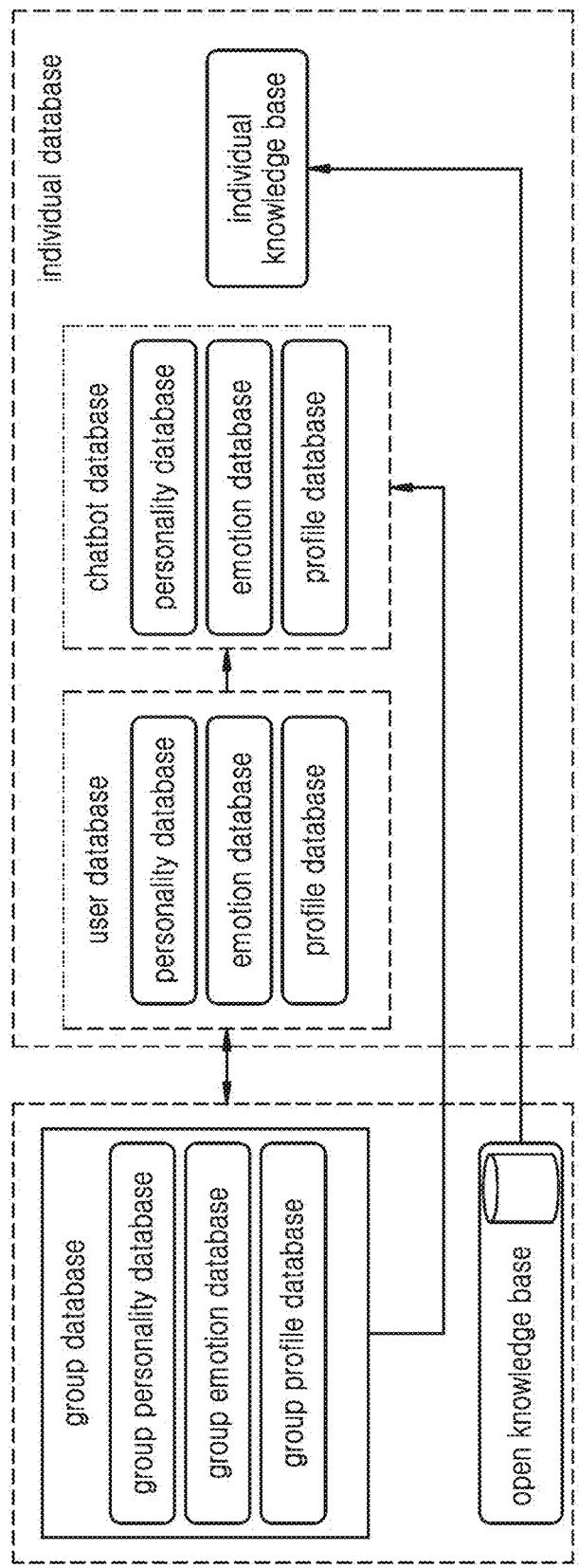
FIG. 2B is a schematic diagram of a backend database provided by an embodiment of the present disclosure.

Wherein, the backend database may include: a group database, an individual database, and an open knowledge base. As shown in FIG. 2B, the group database may include: a group personality database, a group emotion database, and a group profile database, and the individual database includes: a user database, a chatbot database, an individual knowledge base, wherein the user database includes: a user personality database, a user emotion database, and a user profile database, and the chatbot database includes: a chatbot personality database, a chatbot emotion database, and a chatbot profile database; wherein the user database is used to learn and update the personalized features of the user during the dialogue, the chatbot database is updated and adjusted based on the user personalized information in the user database. The group database is mainly used to supplement and improve the information of the user database and the chatbot database. The open knowledge base provides a wealth of common knowledge for chatbot, and may provide common knowledge for the individual knowledge base.

Figure 2C:
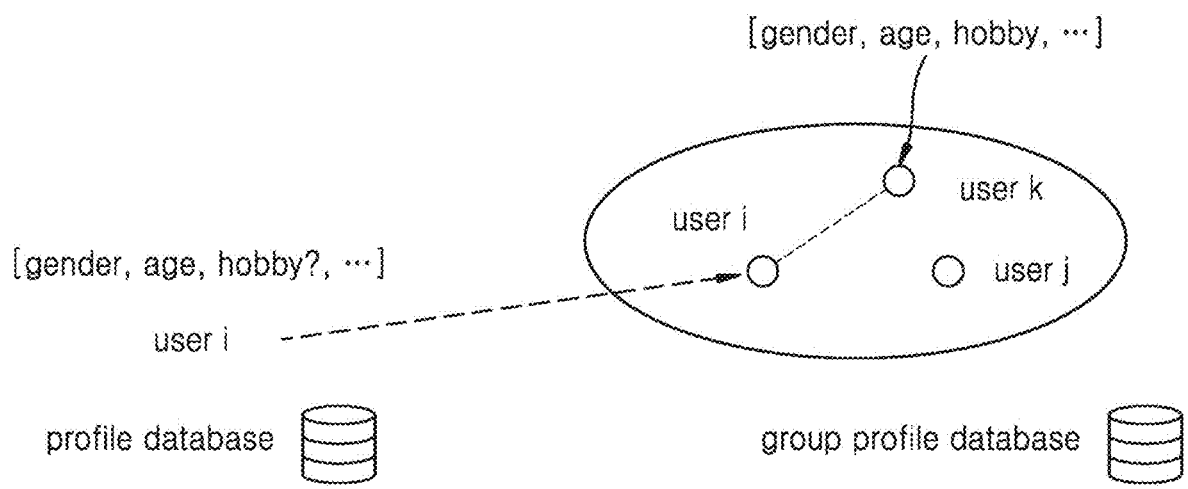
FIG. 2C is a schematic diagram of attribute value filling of an individual profile database by a group database in an embodiment of the present disclosure.

For the embodiments of the present disclosure, the group database is a graph relationship database extracted from a large number of user dialogue data in the Internet, wherein the nodes of the graph relation database represent users and their personalized information (personality features, emotion features, and profile features, etc.) The edge represents the preference relationship between the users, and the preference relationship may be reflected by the weight obtained by the number of dialogues between the users. The main functions of this group database are:

1) Auxiliary user database, supplementing the individual database information, that is, when the personalized information of the user obtained by the current dialogue information is incomplete (i.e., missing or the reliability is close to zero), the personalized information of the user is supplemented and approximated. Here the group profile database is taken as an example to illustrate how the group database supplements the individual database information, as shown in FIG. 2C: in the user profile database, the user i lacks the attribute value of "hobby", in the group database, since the user k has the attribute value of "hobby", and the user k is similar to the user i, its attribute value of "hobby" may be used to fill in missing information of the user i.

2) Auxiliary chatbot individual database, on the basis of recognizing the user's personalized features, helps the chatbot to select the appropriate personalized features, that is, the personalized features of the chat objects that the user may like. This operation is mainly supplemented from the group database in the case where the personalized features stored in the local chatbot individual database are incomplete.

For the embodiment of the present disclosure, the user personality database is used to store the personality features corresponding to the user, and the continuous learning and updating of the user personality features may be realized; the chatbot personality database is used to store the personality features corresponding to the chatbot, so that the chatbot may talk to users through different personalities; the user emotion database is used to store emotion features corresponding to the user and may realize the continuous learning and updating of the user emotion features; the chatbot emotion database is used to store the emotion features corresponding to the chatbot, so that the chatbot may talk to the user through different emotions; the user profile database and the chatbot profile database are used to store the user's profile information and the chatbot's profile information, respectively. In the embodiments of the present disclosure, the individual knowledge base is mainly used to record the local knowledge information in the dialogue to implement the chatbot's long-term context memory, and the input of the database is connected with the dialog management DM, and provides the NLG with dialogue context knowledge information. The database is independent of other databases.

For the embodiment of the present disclosure, the open database is also referred to as an online knowledge base or a knowledge graph, and is mainly a common knowledge network, such as <XXX, President, YY>, <AAA, height, 2.29 m> respectively, indicating that XXX is the president of YY, "AAA is 2.29 m tall." The individual database is connected to the open knowledge base, which provides the chatbot with a wealth of common knowledge of open fields.

Figure 3:
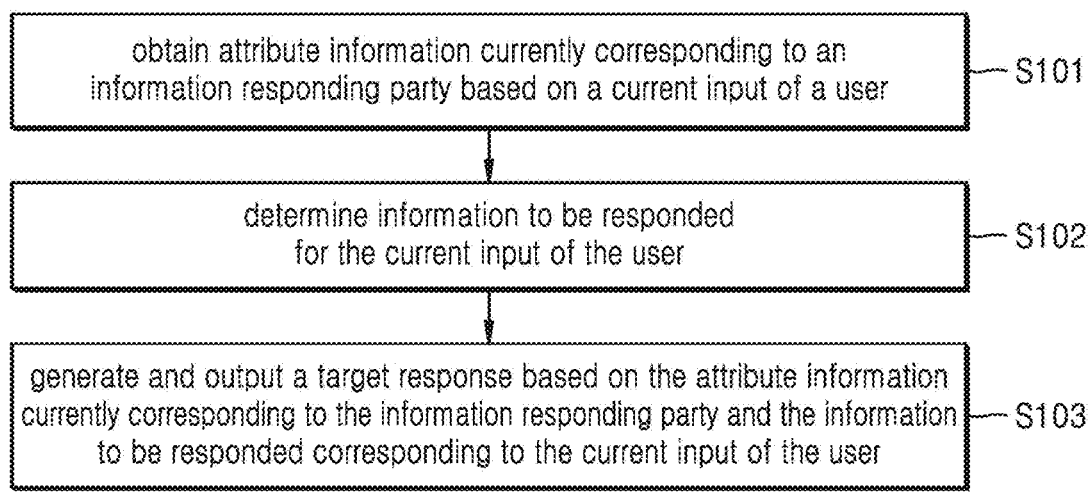
FIG. 3 is a schematic flowchart of an information processing method according to an embodiment of the present disclosure.

With reference to the above structure, the embodiment of the present disclosure provides an information processing method for implementing a dialogue between a user and an information responding party to solve the above technical problem. The method flow is shown in FIG. 3, wherein, In step S101 obtaining the attribute information currently corresponding to the information responding party according to a current input of a user.

For the embodiment of the present disclosure, the information responding party may include: a virtual robot and a physical robot, wherein the virtual robot is an intelligent dialogue system based on natural language processing, which is an intelligent chatbot that combines multiple artificial technologies; the physical robot is a physical apparatus having a virtual robot function.

Step S102: determining information to be responded corresponding to the current input of the user.

Specifically, the step S102 may include: determining the information to be responded corresponding to the current input of the user according to the attribute information currently corresponding to the information responding party.

In step S103, based on the attribute information currently corresponding to the in-formation responding party and the information to be responded corresponding to the current input of the user, a target response is generated and output.

The embodiment of the present disclosure provides an information processing method. Compared with the prior art, the embodiment of the present disclosure obtains the attribute information currently corresponding to the information responding party based on the current input of the user, and then determines the information to be responded corresponding to the current input of the user, and then generates and outputs the target response based on the attribute information currently corresponding to the information responding party and the information to be responded corresponding to the current input of the user. That is, the target response outputted in the embodiment of the present disclosure is generated based on the attribute information currently corresponding to the information responding party, and the attribute information currently corresponding to the information responding party is determined based on the current input of the user, thereby the accuracy of the target response information output by the information responding party (including the intelligent chatbot) may be improved, and improving the user experience.

In a possible implementation manner of the embodiment of the present disclosure, the attribute information currently corresponding to the information responding party includes at least one of the following:

personality information; emotion information; profile information;

The profile information includes at least one of the following: gender, age, weight, height, place of birth, occupation, education background, and hobby.

In another possible implementation manner of the embodiment of the present disclosure, the step S101 may specifically include: obtaining the attribute information currently corresponding to the information responding party based on the historical interaction information and the current input of the user.

Wherein, the historical interaction information includes: historical interaction event information obtained from historical dialogue information.

According to another possible implementation manner of the embodiment of the present disclosure, obtaining the current attribute information currently corresponding to the information responding party according to the current input of the user, includes: if it is determined that the information responding party database is not updated based on the current input of the user, determining that the attribute information currently corresponding to the information responding party is the information responding party attribute information corresponding to a previous user input; and/or, if it is determined to update the information responding party database based on the current input of the user, updating the information responding party database based on the current input of the user, and obtaining the attribute information currently corresponding to the information responding party from the updated information responding party database.

In another possible implementation manner of the embodiment of the present disclosure, obtaining the attribute information currently corresponding to the information responding party from the updated information responding party database includes: when the updated information responding party attribute information from the updated information responding party database is incomplete, supplementing the attribute information currently corresponding to the information responding party with attribute information from group database.

In another possible implementation manner of the embodiment of the present disclosure, updating the information responding party database based on the current input of the user includes: determining the predicted attribute information corresponding to the information responding party based on the current input of the user, and updating the information responding party database based on the predicted attribute information corresponding to the information responding party.

In another possible implementation manner of the embodiment of the present disclosure, determining the predicted attribute information corresponding to the information responding party based on the current input of the user includes: determining the attribute information currently corresponding to the user based on the current input of the user; and determining the predicted attribute information corresponding to the information responding party according to the attribute information currently corresponding to the user.

In another possible implementation manner of the embodiment of the present disclosure, determining the attribute information currently corresponding to the user based on the current input of the user, includes: determining user attribute information corresponding to the current input of the user; determining the attribute information currently corresponding to the user based on the user attribute information corresponding to the current input of the user and user attribute information stored in the user database.

In another possible implementation manner of the embodiment of the present disclosure, determining the attribute information currently corresponding to the user base on the user attribute information corresponding to the current input and the user attribute information stored in the user database includes: when the user attribute information stored in the user database is incomplete, supplementing the attribute information currently corresponding to the user with attribute information from group database.

In another possible implementation manner of the embodiment of the present disclosure, determining the predicted attribute information corresponding to the information responding party according to the attribute information currently corresponding to the user, includes: determining similar attribute information corresponding to the attribute information currently corresponding to the user; determining the predicted attribute information corresponding to the information responding party based on the similar attribute information corresponding thereto.

Specifically, the similar attribute information corresponding thereto is determined based on the attribute information currently corresponding to the user; the attribute information preferred by the user of the similar attribute information corresponding thereto is determined, and the attribute information preferred by the user of the similar attribute information corresponding to thereto is determined as the predicted attribute information corresponding to the information responding party.

In another possible implementation manner of the embodiment of the present disclosure, obtaining the attribute information currently corresponding to the information responding party from the updated information responding party database, includes: obtaining the information responding party attribute information with the highest reliability from the updated information responding party database as the attribute information currently corresponding to the information responding party.

In another possible implementation manner of the embodiment of the present disclosure, the attribute information currently corresponding to the user includes at least one of the following: personality information; emotion information; and profile information.

Wherein, the profile information includes at least one of the following: gender, age, weight, height, place of birth, occupation, education background, and hobby.

In another possible implementation manner of the embodiment of the present disclosure, determining the personality information currently corresponding to the user based on the current input of the user, includes: determining probability distribution information of the user on each personality category based on the current input of the user; determining the personality information currently corresponding to the user based on the probability distribution information of the user on each personality category;

In another possible implementation manner of the embodiment of the present disclosure, determining the emotion information currently corresponding to the user based on the current input of the user, includes: determining probability distribution information of the user on each emotion category based on the current input of the user; determining the emotion information currently corresponding to the user based on the probability distribution information of the user on each emotion category.

The embodiment of the present disclosure provides another information processing method, which is used to implement a dialogue between a user and an information responding party to solve the above technical problem, which is specifically shown in the following:

Step S201 (not shown in the figure), obtaining a current input of a user.

Step S202 (not shown in the figure), generating and outputting a target response information based on the current input of the user and the historical interaction information.

The embodiment of the present disclosure provides an information processing method. Compared with the prior art, the embodiment of the present disclosure obtains the current input of the user, and then generates and outputs a target response based on the current input of the user and the historical knowledge information of the interaction between the user and the information responding party. That is, the target response information outputted in the embodiment of the present disclosure is generated based on the current input of the user and the historical knowledge information of the interaction between the user and the information responding party, and is not only generated according to the current input of the user, thereby improving the accuracy of the target response information output by the information responding party (including the intelligent chatbot) may be improved, and improving the user experience.

In another possible implementation manner of the embodiment of the present disclosure, step S202 may include: step S2021 (not shown) and step S2022 (not shown), wherein, Step S2021: obtaining historical knowledge information that matches the current input of the user.

Step S2022: generating and outputting target response information based on the current input of the user and the historical interaction information that matches the current input information of the user.

Wherein, the historical interaction information includes: historical interaction event information obtained from historical dialogue information.

In another possible implementation manner of the embodiment of the present disclosure, after generating and outputting the target response information, further includes: extracting key information from the current input of the user and the target response information by using a preset processing manner, and storing the key information in the form of the knowledge representation.

Wherein, the preset processing manner includes at least one of the following:

entity recognition; relation extraction; event extraction; noise reduction processing.

On the basis of the above embodiments, combined with the above architecture, and through two specific examples (Example 1 and Example 2), the specific flow that the information responding party (hereinafter, chatbot is used as an example instead of the information responding party) to talk with the user to generate a target response is introduced. In Example 1, that is, constructing a actively and growing personalized chatbot, it may continuously improve and grow in the process of dialogue with the user, and has personalized features such as personality, emotion, profile, individual knowledge, etc. In the chatting process, the attribute information (personalized feature) of the user may be predicted in real time, and the attribute information of the chatbot chatting with the user is determined according to the attribute information of the user, and chatbot talks to the user through the determined attribute information of the chatbot. In Example 2, the chatbot may have the ability of long-term context memory, and store historical knowledge information (historical dialogue information during the interaction between the user and the chatbot). During the process of chatting with the user, the chatbot may generate and output the response to the user based on the stored historical knowledge information. The details are shown as follows:

EXAMPLE 1

The embodiment of the present disclosure introduces an information processing method. In this embodiment, the attribute information currently corresponding to the chatbot (i.e., the personality, emotion, and profile of the chatbot in the dialogue process that matches the current input of the user) may be determined according to the current input of the user, and a dialogue process is performed with the user based on the attribute information currently corresponding to the chatbot. The specific method flow is as follows:

Step S301 (not shown in the figure): obtaining the attribute information currently corresponding to the robot according to the current input of the user.

For the embodiment of the present disclosure, the current input of the user includes:

text information currently input by the user and/or voice information currently input by the user.

In a possible implementation manner of the embodiment of the present disclosure, the attribute information currently corresponding to the robot includes at least one of the following:

personality information; emotion information; profile information;

The profile information includes at least one of the following: gender, age, weight, height, place of birth, occupation, education background, and hobby.

According to another possible implementation manner of the embodiment of the present disclosure, obtaining the attribute information currently corresponding to the robot according to the current input of the user, includes: if determining that the robot database is not updated according to the current input of the user, determining that the attribute information currently corresponding to the robot is the robot attribute information corresponding to the previous user input; if determining to update the robot database according to the current input of the user, then updating the robot database according to the current input of the user, and obtaining the attribute information currently corresponding to the robot from the updated robot database.

In another possible implementation manner of the embodiment of the present disclosure, updating the robot database according to the current input of the user includes: determining predicted attribute information corresponding to the robot according to the current input of the user, and updating the robot database based on the predicted attribute information corresponding to the robot.

In another possible implementation manner of the embodiment of the present disclosure, determining the predicted attribute information corresponding to the robot according to the current input of the user, includes: determining attribute information currently corresponding to the user according to the current input of the user; and determining the predicted attribute information corresponding to the robot according to the attribute information currently corresponding to the user.

In another possible implementation manner of the embodiment of the present disclosure, the attribute information currently corresponding to the user includes at least one of the following:
personality information; emotion information; profile information;

The profile information includes at least one of the following: gender, age, weight, height, place of birth, occupation, education background, and hobby.

In another possible implementation manner of the embodiment of the present disclosure, determining the attribute information currently corresponding to the user according to the current input of the user, includes: determining user attribute information corresponding to the current input; determining the attribute information currently corresponding to the user based on the user attribute information corresponding to the current input and the user attribute information stored in the user database.

In another possible implementation manner of the embodiment of the present disclosure, determining the predicted attribute information corresponding to the robot according to the attribute information currently corresponding to the user, includes: searching for first similar attribute information based on the attribute information currently corresponding to the user, wherein the first similar attribute information is the attribute information similar to the attribute information currently corresponding to the user; searching for second similar attribute information, wherein the second similar attribute information is the robot attribute information corresponding to the first similar attribute information; and determining the predicted attribute information corresponding to the robot as the second similar attribute information.

In another possible implementation manner of the embodiment of the present disclosure, obtaining the attribute information currently corresponding to the robot from the updated robot database includes: obtaining the updated robot attribute information from the updated robot database as the attribute information currently corresponding to the robot.

Figure 10:
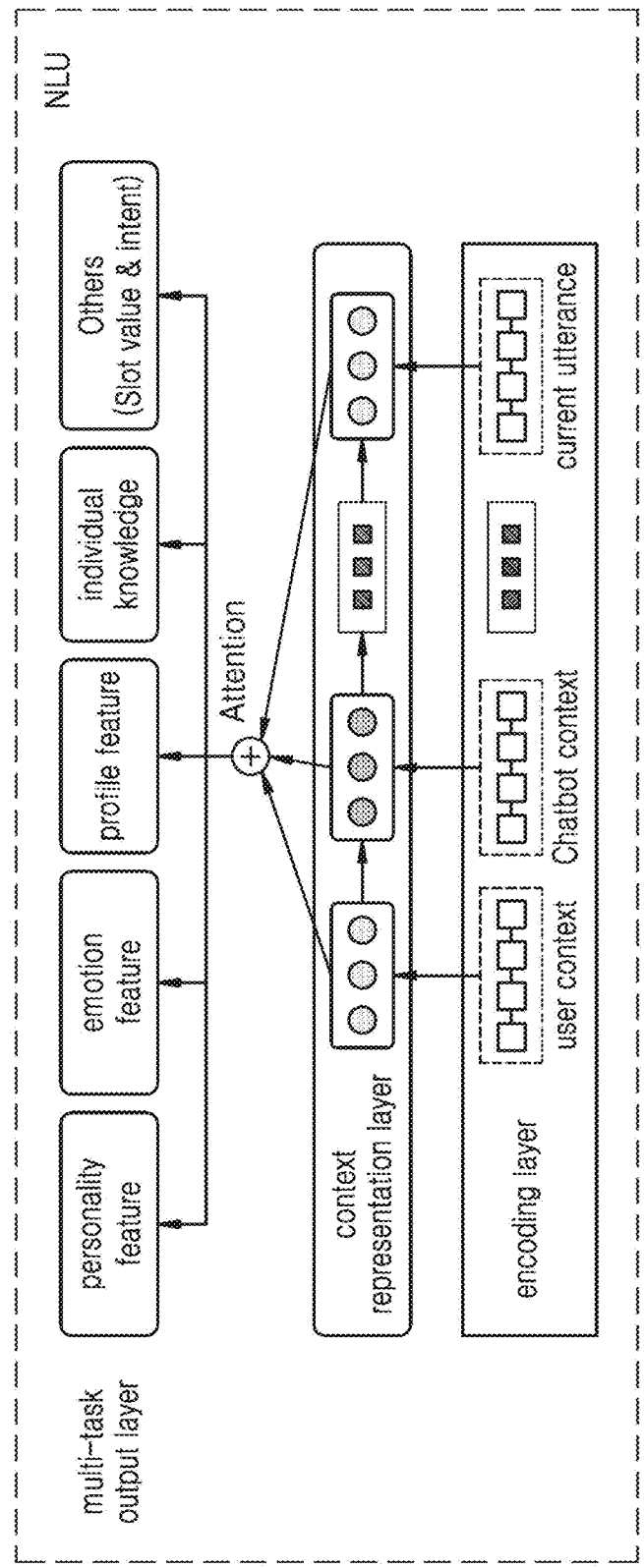
FIG. 10 is a schematic diagram of a multi-task learning model framework in an embodiment of the present disclosure.

It may be seen from the above embodiment that in the process of obtaining the attribute information corresponding to the robot, it is necessary to first determine the attribute information currently corresponding to the user based on the current input of the user, and then determine whether to update the robot database, and obtain the set of the attribute information corresponding to the robot based on the determined result. The following describes through a more specific implementation, how to determine the attribute information currently corresponding to the user based on the current input of the user, and then how to determine whether the robot database is updated, and how to obtain the attribute information corresponding the robot in the case of updating or not updating:

1. Specifically how to determine the attribute information currently corresponding to the user (personality information, emotion information, and profile information) and individual knowledge information such as entity, entity relation, and intent based on the current input of the user (which may be collectively referred to as historical interaction events):

For the embodiment of the present disclosure, a method for directly determining attribute information currently corresponding to the user based on the current input of the user is: respectively constructing independent task-learning models for these tasks (personality extraction task, emotion extraction task, profile extraction task, and individual knowledge extraction task), wherein this method is simple but ignores the fact that tasks are interrelated and interact with each other. Regarding this, the embodiment of the present disclosure proposes a joint learning method (that is, jointly extracting the attribute information corresponding to the user based on the deep neural network model), and regards these tasks as multi-task learning. Joint learning helps to complement the information between tasks when each task feature is extracted, and may improve the feature extraction effect of each task:

Specifically, the disclosed dialogue text is crawled from the network, which is used as a dialogue training corpus, and the multi-task learning model constructed is trained by the dialogue training corpus. Wherein, the model framework is shown in FIG. 10. The network model mainly includes three layers: the first layer of encoding layer, of which the input information includes context representation (the context representation corresponding to the user, the context representation corresponding to Chatbot, and information such as the current input of the user); the second layer is the context information representation layer, that is, the context information feature extraction layer is considered on the basis of the input information; and the third layer, i.e., the output layer, which outputs category information such as personality features, emotion features, profiles, individual knowledge, intent, etc. It should be noted that the joint extraction is mainly for NLU analysis of the user input. The individual knowledge in the output refers to the entity, entity relation, intent, slot value and other information. In addition to the information in the individual knowledge base, there is event knowledge information. The extraction needs to be obtained from the user input and the chatbot response in the historical dialogue. The specific method refers to FIG. 5A and the method description thereof.

Figure 11A:
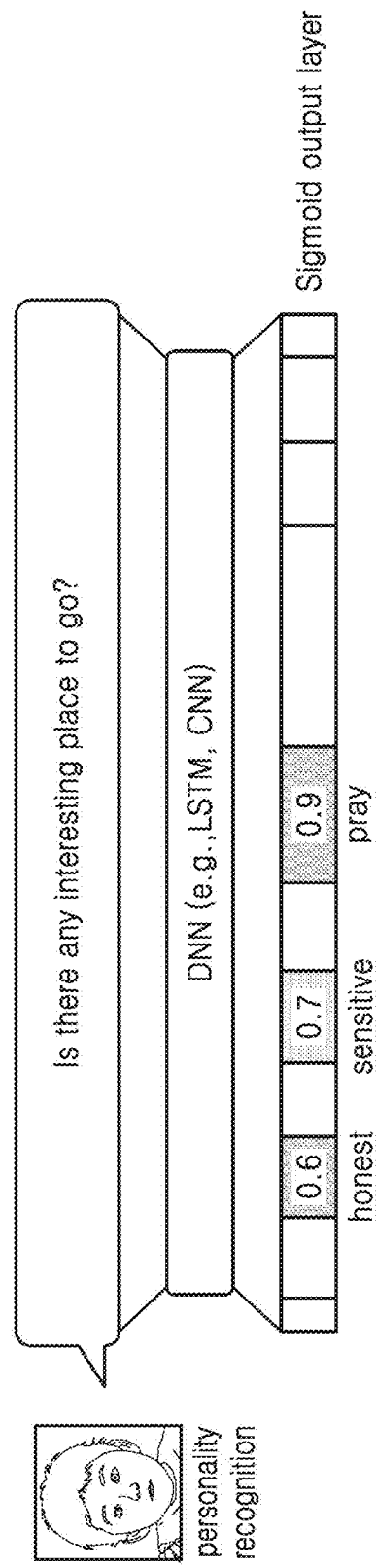
FIG. 11A is a schematic structural diagram of a personality feature prediction model based on multi-label learning in an embodiment of the present disclosure.

For the embodiment of the present disclosure, the personality features extracted by the multi-task learning model are mainly composed of some category labels, and are characterized by the form of feature vectors. For example, as shown in FIG. 11A, the text information currently corresponding to the current input of the user is as "Is there any interesting place to go?", and through the multi-task learning model (the multi-task learning model is a learning model based on LSTM, CNN or DNN), the personality feature vector corresponding to the user (the probability that the user belonging to any personality type, includes: the probability of belonging to the honest personality type is 0.6, the probability of belonging to the sensitive personality type is 0.7, and the probability of belonging to the prayer personality type is 0.9 . . . ) is output.

Figure 23:
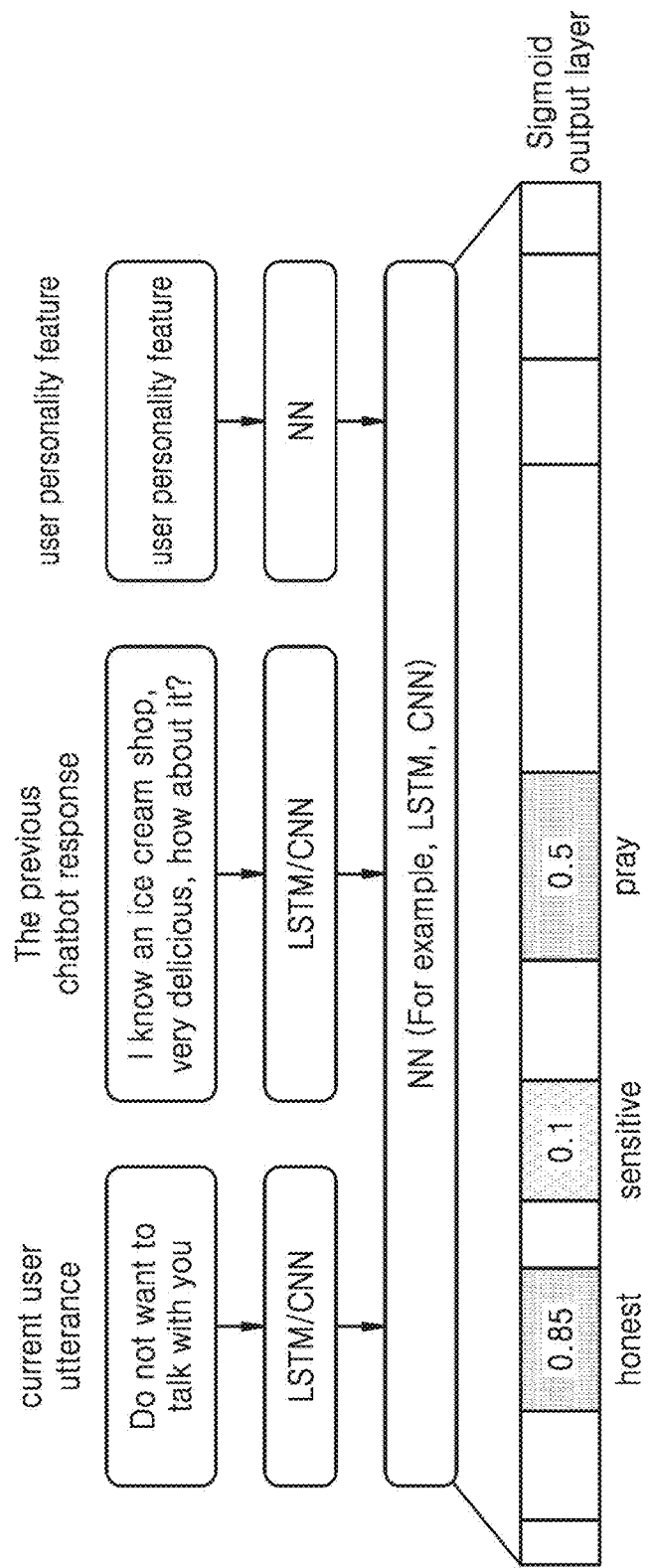
FIG. 23 is a schematic diagram for predicting chatbot attributes in an embodiment of the present disclosure.

For the embodiment of the present disclosure, the selection of the chatbot personality feature is related to the user's personality and the user's utterance, and prediction of the chatbot personality that the user may like may construct a multi-label prediction model, and the input information includes the current user personality feature, the current user utterance and the jointly predicted by the chatbot responses at the previous time. FIG. 23 shows the model of the prediction of the chatbot's personality feature, which is split into four layers:

Layer 1, input layer: including current user utterance (user current input) $x1$, previous time Chatbot response $x2$ and current user's personality feature $x3$;

Layer 2, using the neural network (LSTM, CNN or NN) to encode the three types of data information (the current input of the user, the chatbot response at the previous time and the current personality features), respectively, to obtain $h11$, $h12$, $h13$;

Layer 3, feature integration layer: inputting the three encoded information h11, h12, h13 into the neural network (NN) model (which may also include: LSTM, CNN) for feature fusion;

Layer 4, output layer, which has the multi-label prediction output, each node corresponds to a personality category, and the activation function uses Sigmoid.

Figure 11B:
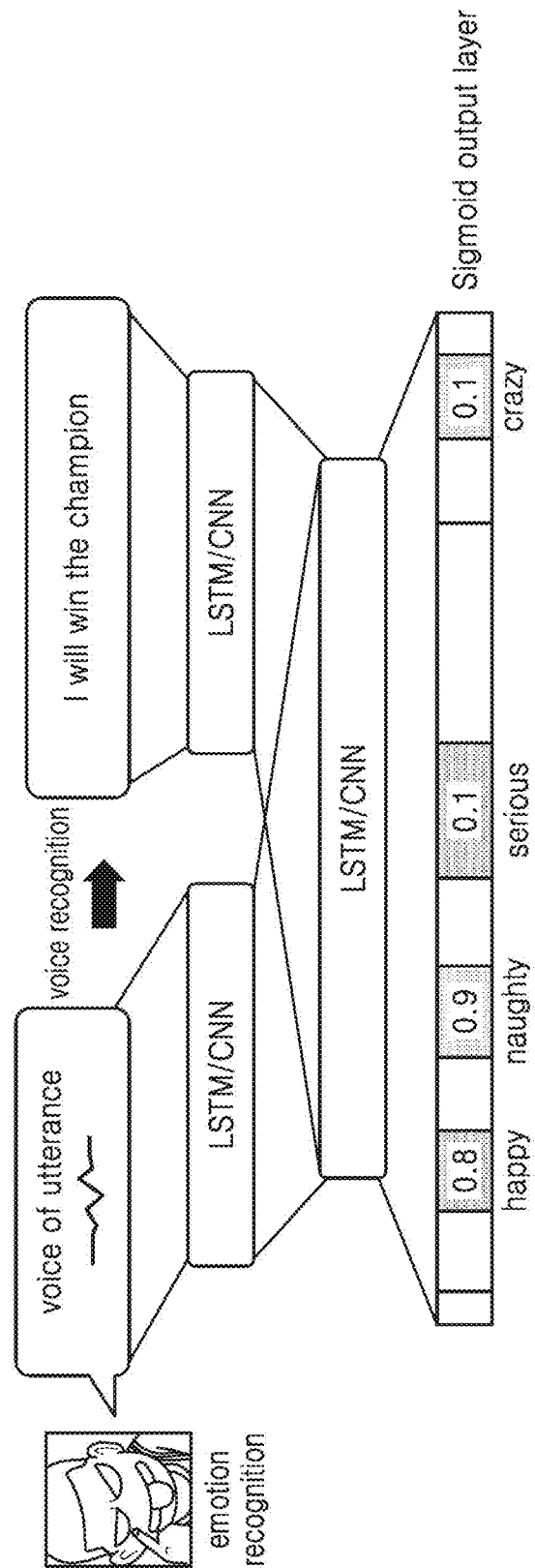
FIG. 11B is a schematic structural diagram of an emotion feature prediction model based on multi-label learning in an embodiment of the present disclosure.

For the embodiment of the present disclosure, the emotion features extracted by the multi-task learning model are mainly composed of some emotion type labels, and are characterized by the form of feature vectors. For example, as shown in FIG. 11b, the voice recognition is performed based on the voice currently input by the user to obtain the corresponding text information "I will win the championship", and then obtain the emotion feature vector corresponding to the user through the LSTM or CNN-based multi-task learning model (the probability that the user belongs to any emotion type, including: the probability of belonging to the happy emotion type is 0.8, the probability of belonging to the naughty emotion type is 0.9, the probability of belonging to the serious emotion type is 0.1, and the probability of belonging to the crazy emotion type is 0.1 . . . ).

For the embodiment of the present disclosure, the selection of the chatbot emotion feature has a relation with the user's emotion and the user's utterance, and the prediction of the chatbot emotion feature that the user may like may construct a multi-label prediction model, and the input information includes the current user emotion feature, the current user utterance voice (the current input of the user) and jointly predicted by the chatbot responses at the previous time. The model network structure of the emotion feature prediction of the chatbot is similar to the chatbot personality feature prediction network, which is not repeated here. It should be noted that when predicting the chatbot personality information, there is no input speech input to the chatbot, since that the predicted user emotion feature has extracted the emotion information in the user's voice.

Figure 22A:
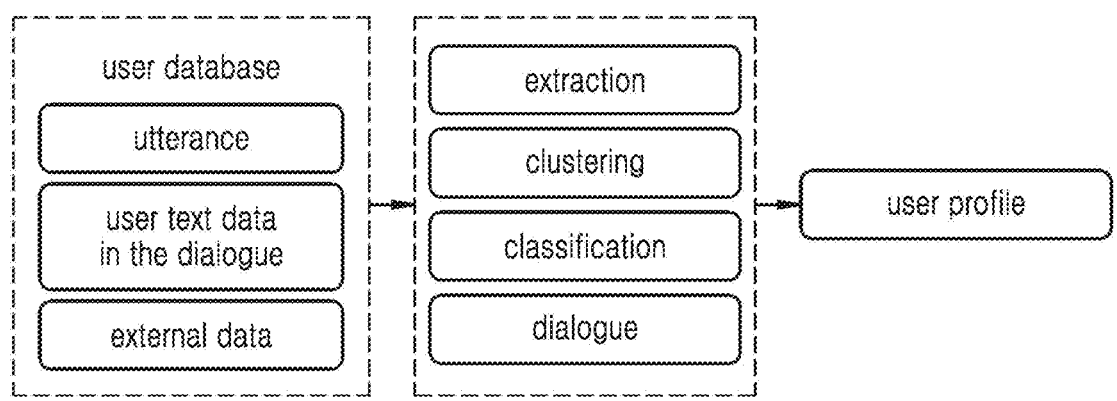
FIG. 22A is a schematic diagram of a flow for extracting user profile information in an embodiment of the present disclosure.

For the embodiment of the present disclosure, the profile information currently corresponding to the user may be extracted from the relevant data according to the profile template as shown in FIG. 21A. The relevant data may include user data, such as user text data in the dialogue, the user's APP usage data, and external data, and extract user profile information by using methods such as feature extraction, clustering, classification, dialogue, etc., as shown in FIG. 22A.

Figure 22B:
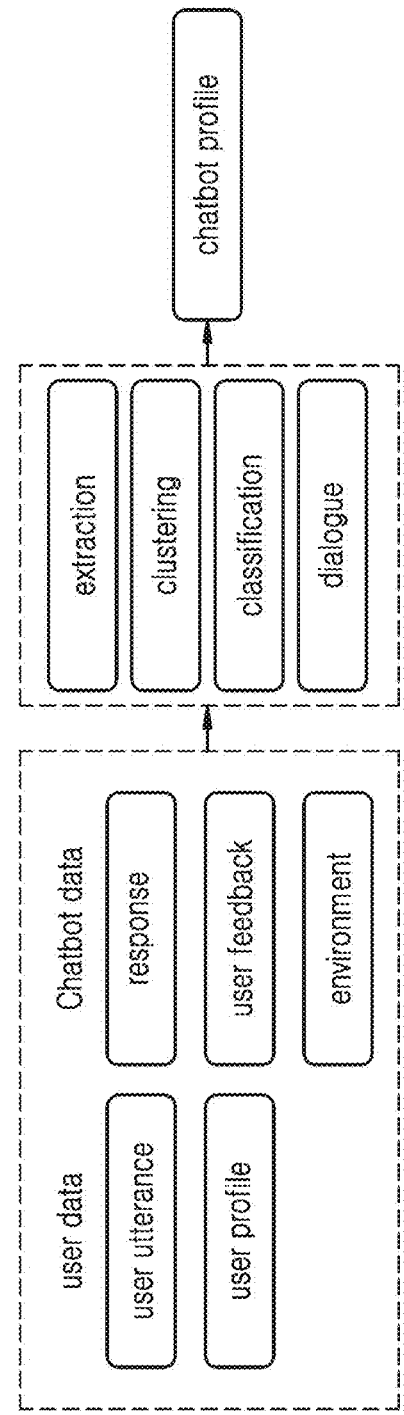
FIG. 22B is a schematic diagram of a flow of extracting chatbot profile information in an embodiment of the present disclosure.

Further, the profile information corresponding to the chatbot may be extracted from the relevant data according to the profile template (as shown in FIG. 21B). The obtained profile data includes the use's utterance, chatbot's response text data, the operation environment data, and the user's feedback data, and the like; in addition to the above data, it also includes the current user profile feature information. Feature extraction, clustering, classification and other methods are used to extract the chatbot's profile information as shown in FIG. 22B.

Figure 14:
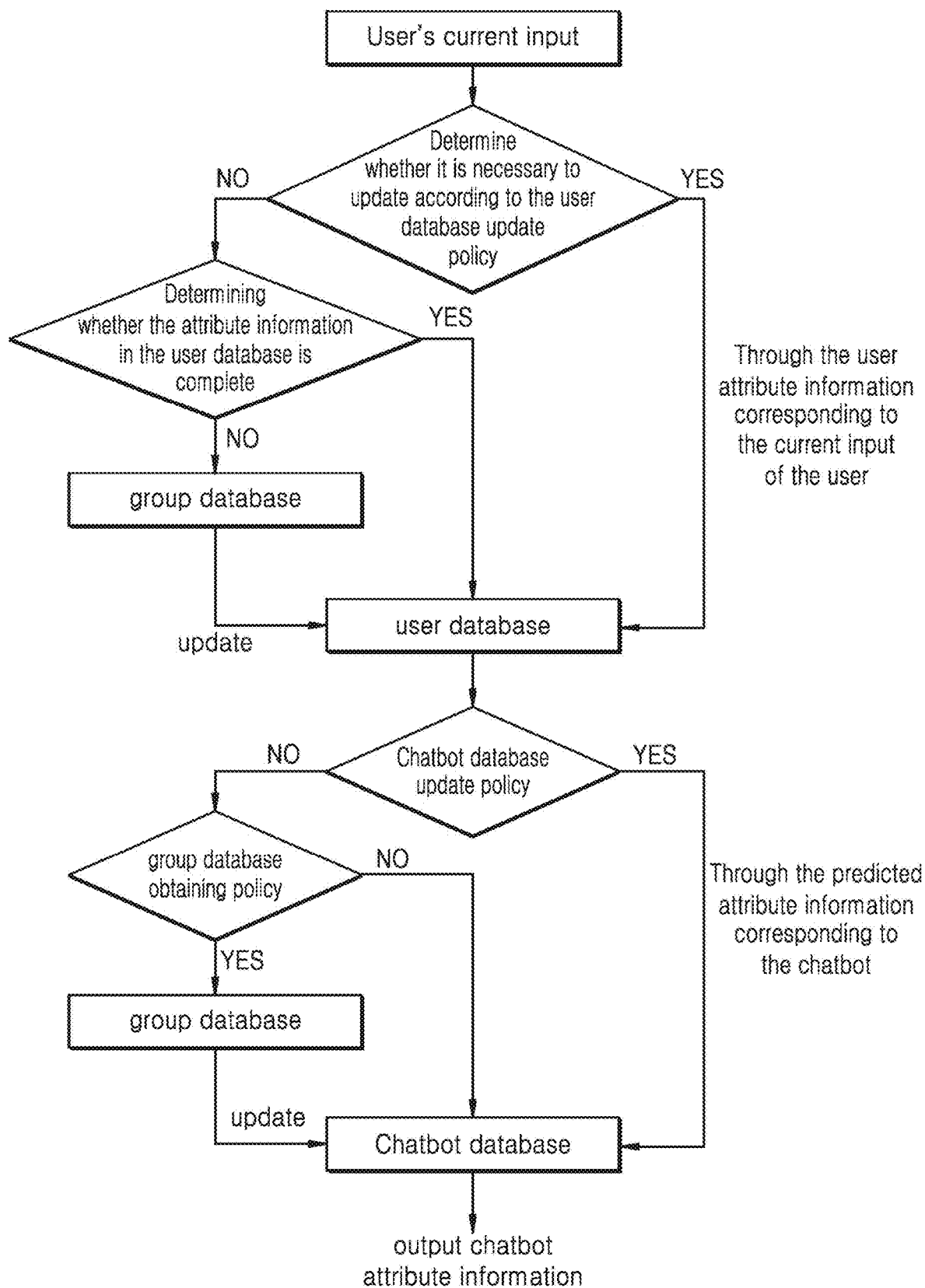
FIG. 14 is a schematic flowchart for updating a database in an embodiment of the present disclosure.

2. Specifically, how to determine whether the robot database is updated, and how to obtain the attribute information corresponding to the robot in the case of updating or not updating is introduced:

For the embodiment of the present disclosure, the update policy for the chatbot database includes: a chatbot database update policy for determining whether to update the chatbot database, and a group database obtaining policy for determining whether it is necessary to obtain the chatbot attribute information from the group database for updating the chatbot database. The embodiment of the present disclosure, first, determines whether to update the chatbot database according to the chatbot database update policy, if the chatbot database update policy indicates updating, then the chatbot database is updated, and if the chatbot database update policy indicates not updating, whether to update the chatbot database is determined according to the group database obtaining policy, as shown in FIG. 14.

For the embodiment of the present disclosure, if the chatbot database update policy and the group database obtaining policy both indicate that the chatbot database is not updated, it is determined that the attribute information currently corresponding to the robot corresponding to the current input of the user is the same as the robot attribute information corresponding to the previous user input, then the target response is still generated and output according to the robot attribute information corresponding to the previous user input.

The embodiment of the present disclosure determines to update the chatbot database according to the chatbot database update policy, and determines the predicted attribute information corresponding to the robot based on the current input of the user, and then updates the robot database by using the determined predicted attribute information corresponding to the robot; if the database update policy does not indicate to update but the group database obtaining policy indicates to update the robot database, then determines the attribute information currently corresponding to the user according to the current input of the user, and searches for the user attribute information (first similar attribute information) similar to the attribute information currently corresponding to the user from the group database according to the attribute information currently corresponding to the user, and then searches for attribute information (second similar attribute information) corresponding to the robot corresponding to the robot corresponding thereto from the group database based on the first similarity attribute information, and then updates the robot database through the second similar attribute information database.

For the embodiment of the present disclosure, if the chatbot database is updated by the chatbot database update policy and/or the group database obtaining policy, the set of the updated chatbot attribute information is input as the chatbot attribute information on which the target response is generated.

For the embodiment of the present disclosure, as known from the described above, when updating the chatbot database, it is necessary to supplement the user attribute information obtained based on the current input of the user according to the user attribute database, and therefore it is necessary to update the user attribute information during the process of obtaining the chatbot attribute information to generate the target response. In the embodiment of the present disclosure, whether to update the user database is determined by the user database update policy (determined by the database policy in the DM) and whether the attribute information in the database is complete.

Specifically, if the user database is updated according to the indication of the user database update policy, the user database is updated based on the user attribute information obtained by the current input of the user; if the user database is not indicated to be updated according to the user database update policy, whether to update the user database is determined based on whether the attribute information in the user database is complete (for example, whether part of the attribute information is missing, or the probability of missing any attribute information) as shown in FIG. 14, which is only an example in FIG. 14 and is not used as a limitation on the update method, that is, the embodiment of the present disclosure may also only update the chatbot database without updating the user database, or only update the user database without updating the chatbot database.

For the embodiment of the present disclosure, when the user performs an initial dialogue with the chatbot, the user database and the chatbot database may not store any attribute information, therefore when receiving the current input of the user, the robot attribute information corresponding to the user is determined by the group database.

Taking the personality attribute as an example, how to determine the personality attribute of the chatbot corresponding to the user through the group database is introduced:

1. Considering a user u with personality attribute X, when the action obtained by the group database obtaining policy is 'YES', the personality user u' closest to the user u from the group personality database is found; when the action is 'No', the chatbot database is not updated, and the chatbot's personality attribute is unchanged, that is, the chatbot personality attribute under the previous dialogue is stilled used.
2. All personalities $\{V_1, V_2, \ldots, V_n\}$ that the user u' likes are found from the group personality database (according to the connection relationship of the group database graph);
3. The similarity $S(X, V_1)$, i=1, ..., n is calculated and the $X'=\max_i S(X, V_i)$ is selected with the greatest similarity to X as the current personality attribute dialogue corresponding to the Chatbot in the dialogue.

Figure 12:
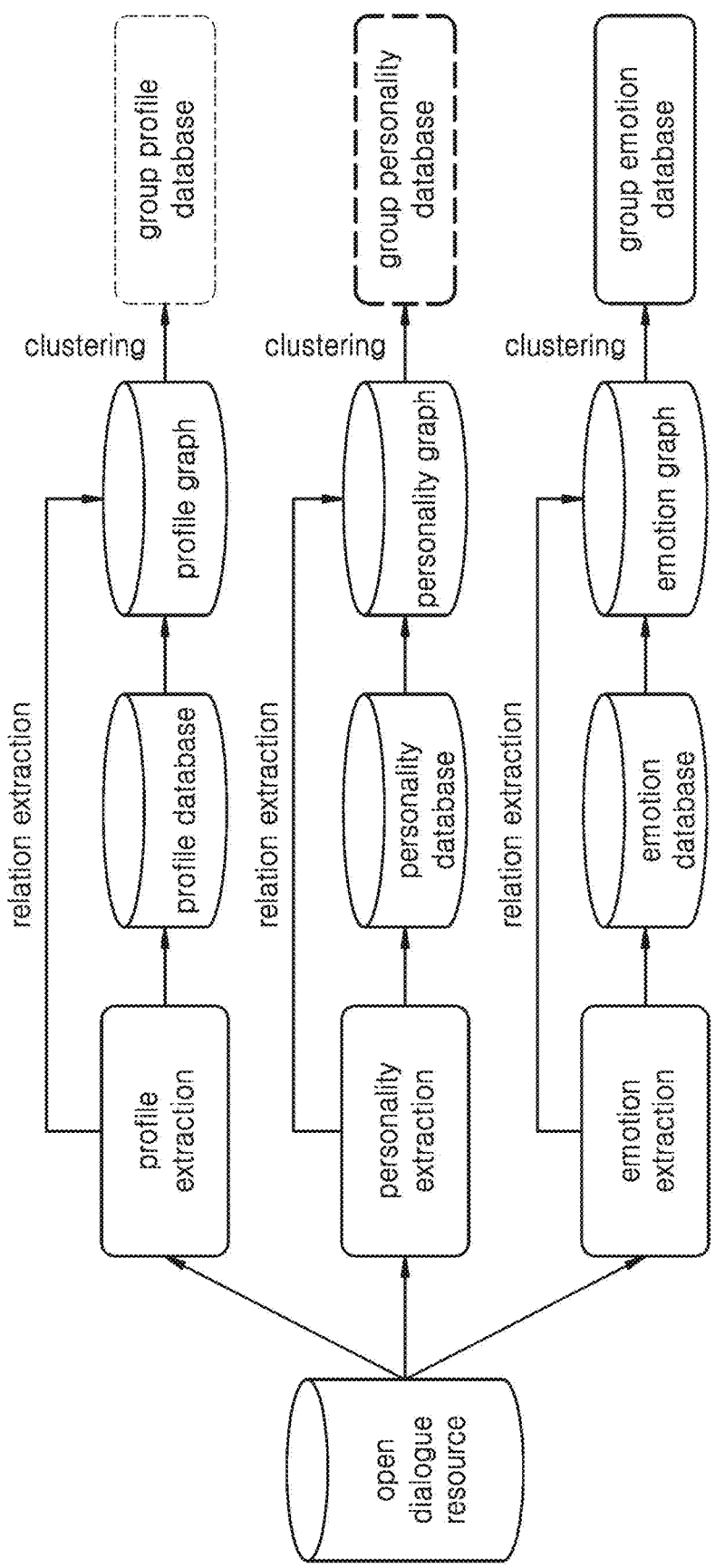
FIG. 12 is a schematic flowchart of constructing a group database in an embodiment of the present disclosure.

For the embodiment of the present disclosure, the group database may include: a group personality database, a group emotion database, and a group profile database. The embodiment of the present disclosure may construct a group database by the following method, as shown in FIG. 12:

1. Obtaining a large amount of open dialogue resources from the Internet;
2. Using profile attribute extraction model, personality recognition model and emotion recognition model respectively to extract feature information such as profile, personality and emotion, and store them in the group profile database, group personality database and group emotion database;
3. Performing relation extraction between users in combination with the above databases to construct profiles graphs, personality graphs, and emotion graphs respectively;
4. Clustering group profiles (personality or emotion) and relationship preferences, to obtain the group's feature information, and constructing a group database (group profile database, group personality database and group emotion database).

Step S302 (not shown in the figure): determining information to be responded corresponding to the current input of the user.

For the embodiment of the present disclosure, step S302 may specifically include: determining information to be responded corresponding to the current input of the user based on attribute information currently corresponding to the robot.

Figure 6:
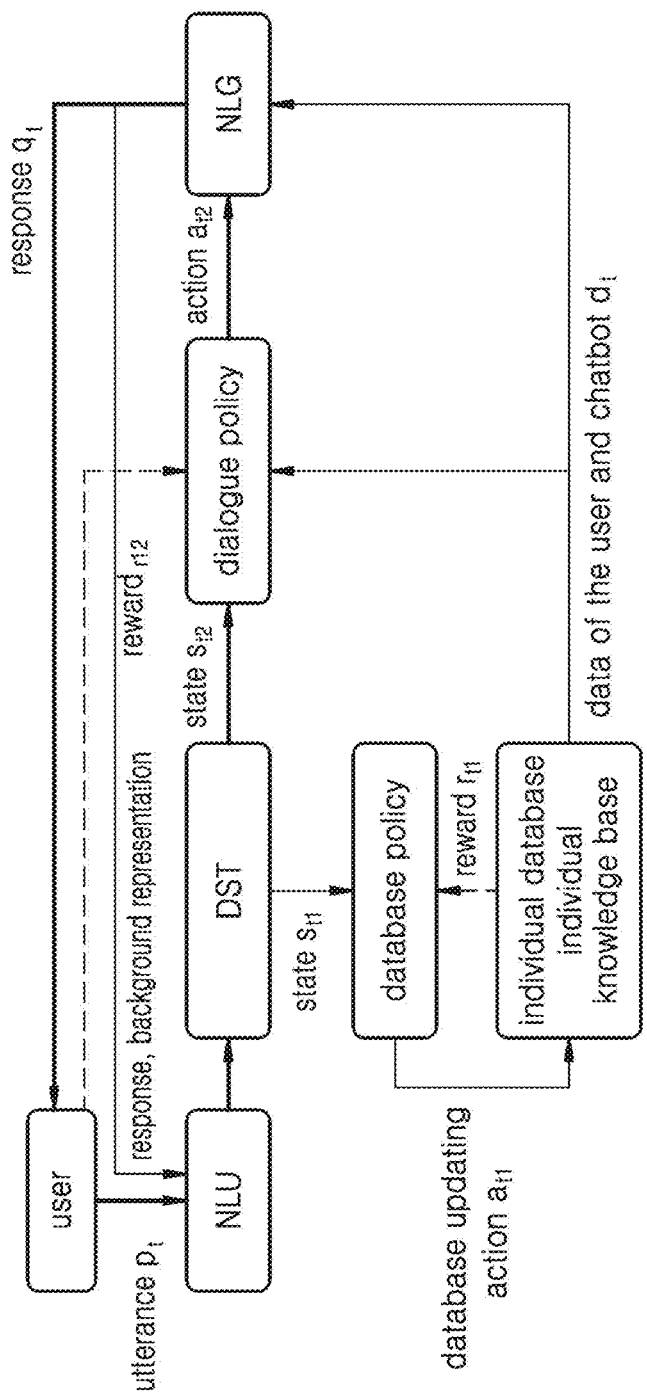
FIG. 6 is a diagram of a dialog management and database update framework based on hierarchical reinforcement learning in an embodiment of the present disclosure.

For the embodiment of the present disclosure, step S301 introduces the database update policy, and step S302 introduces, the determining of the information to be responded corresponding to the current input for the dialog policy based on the dialog generation policy, wherein the dialog generation is based on establishing the update of the database. There is a hierarchical relationship between before and after. The embodiment of the present disclosure strengthens learning through a hierarchical policy to achieve joint management of the above two. The embodiment of the present disclosure designs two policies for the generation of the information to be responded and the database update. As shown in FIG. 6, for each time step t=1, . . . ,T, it is assumed that the sequence of dialogue history states is $S_t=p_1,q_1,r_1, \ldots, p_t,q_t,r_t$ wherein, $p_t,q_t,r_t$ respectively represents the user utterance at time t, the chatbot response at time t and rewards received by an agent at time t. The reward $r_t$ consists of two parts: the reward $r_{t1}$ from the update of the database (individual database and individual knowledge base) and the reward $r_{t2}$ from the dialogue generation (the generation of the target response).

Figure 7A:
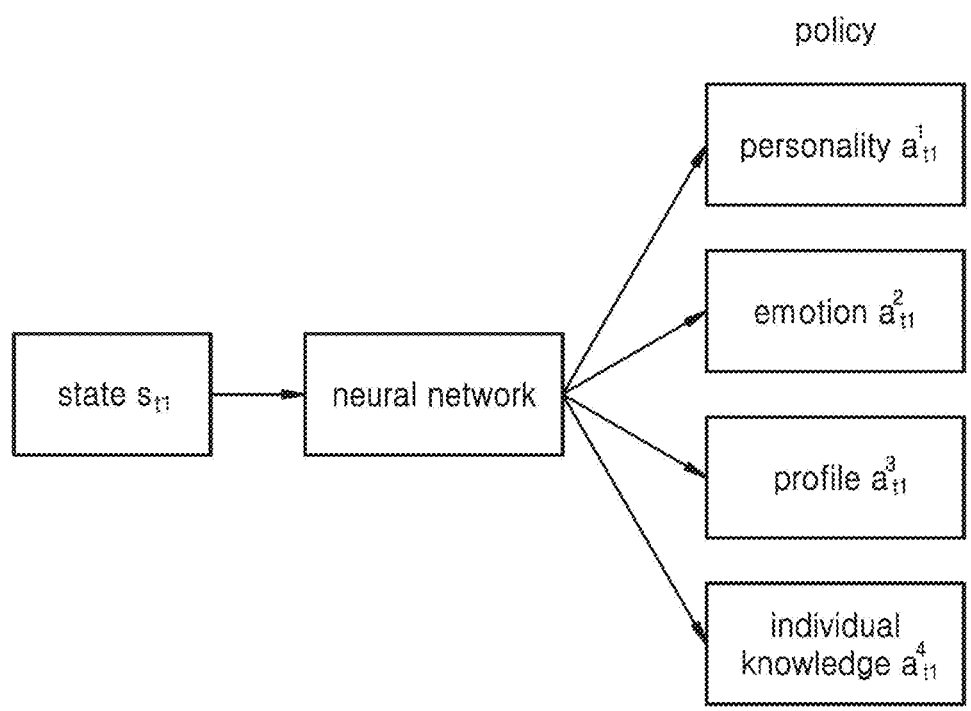
FIG. 7A is a schematic diagram of a database update policy network in an embodiment of the present disclosure.
Figure 7B:
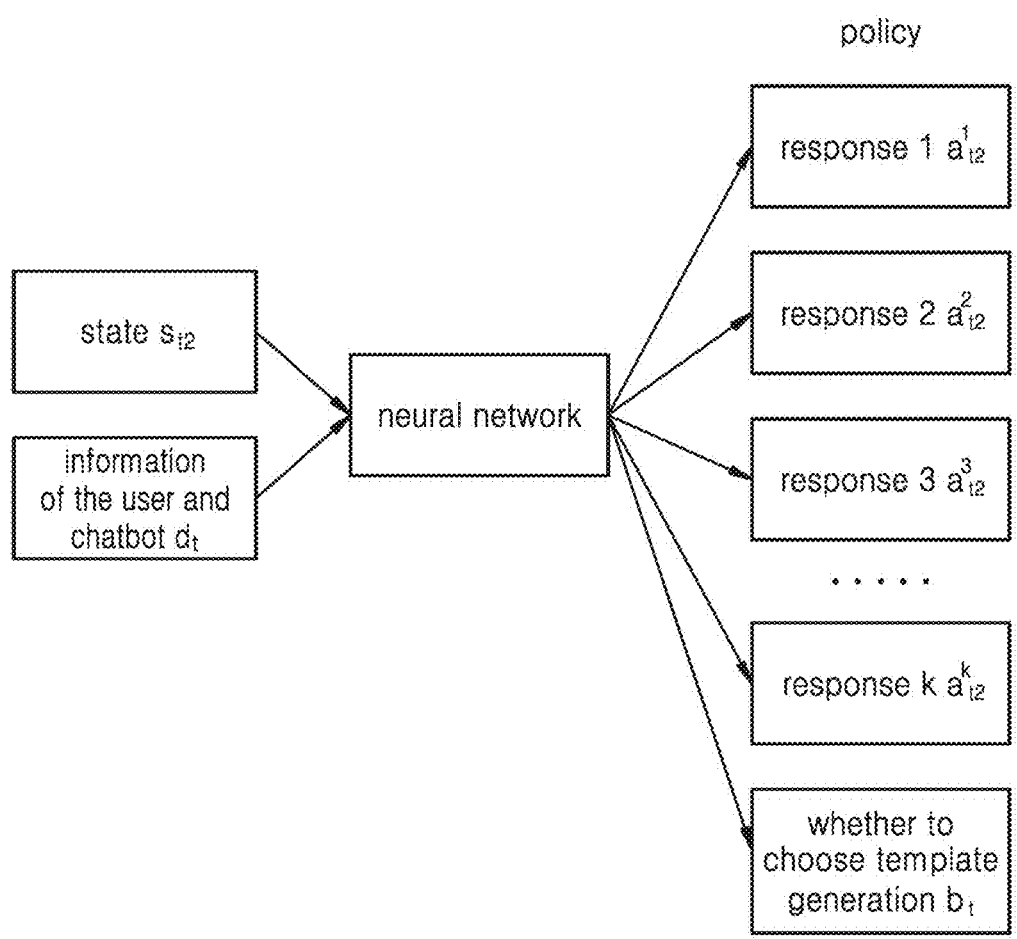
FIG. 7B is a schematic diagram of a dialog generation policy network in an embodiment of the present disclosure.

Specifically, the policy network for hierarchical policy-based reinforcement learning is composed of two sub-policy networks, that is, a database update policy network and a dialog generation policy network. In the process of reinforcement learning, the two policy networks are coupled to each other and jointly learned. In the embodiment of the present disclosure, the database update policy network is as shown in FIG. 7A, and the target is: the update of the database, selecting a database that needs to be updated; input: state $s_{t1}$, personality, emotion, profile, and historical feature of local knowledge; output: database policy $\pi(a)=P(a|s_{t1})$ for four databases; network: Deep Neural Networks (DNN); rewards: weighted sum of $r_{t1}$ and $r_{t2}$, that is $R_{t1}=\lambda_1 r_{t1}+\lambda_2 r_{t2}$. In the embodiment of the present disclosure, the dialog policy network is constructed, and a dialog generation policy is generated for NLG. The network structure is as shown in FIG. 7B, wherein the target: selecting the next dialog action and determining whether the NLG is a template generation or a model generation; input: state $s_{t2}$, which including current utterance $p_t$, context representation $c_t$, and Chatbot data $d_t$; output: dialog policy $\pi(a)=P(a|s_{t2})$ for all available response actions; network: encoder-decoder network based on deep learning network (Long Short-Term Memory (LSTM), Convolutional Neural Network (CNN) or Attention network, etc.;) reward: rewards $r_{t2}$, which is used for evaluating the effect of the dialogue generation.

For the embodiment of the present disclosure, in reinforcement learning, reward is important information for updating the policy network. The definition of reward depends on the needs of the actual task, therefore there may be many forms. The following describes the reward definition criteria for the database update policy network and the dialog generation management policy network:

Definition of reward $r_{t1}$ of the update of the database
(1) As low as possible database updating frequency, such as $$r_{11} = \frac{1}{T}\sum_{t=1}^{T} \sum_{k=1}^{4} [\![P(a_t^k \mid s_t) > 0.5]\!],$$

wherein $a_t^k$ represents the action for the k-th database in the state $s_t$, and $[\![.]\!]$ is an indication function.

(2) Increasing the amount of database information as high as possible, such as $$r_{12} = \frac{1}{T}\sum_{t}^{T} \sum_{u \in U_t} H(\Phi_{(t-1)u}, \Phi_{tu}),$$

the average mutual information of the two state $\Phi_{(t-1)u}$ and $\Phi_{tu}$ before and after the database update.

Definition of reward $r_{t2}$ of the generation of the dialogue (1) Information flow, which the chatbot may generate a response with message amount in the dialogue to ensure a sustainable dialogue, such as $r_{21}=-\log \cos(h_t, h_{t+1})$ wherein $h_t$, $h_{t+1}$ are the coded representation of the encoder for continuously generating the utterance;

(2) Semantic relevance, which the generated response should be able to satisfy the syntax and be related to the user's utterance, for example, $r_{22}=\log p_{seq2seq}(a|p_t, q_t)+\log p_{seq2seq}^{backward} p_{seq2seq}(p_t|a)$, wherein the first item represents the probability of generating a response a and the second item represents the probability of generating the previous sentence of the dialogue.

A reward $r_{t2}$ can be defined as a weighted sum of $r_{21}$ and $r_{22}$, i.e., $r_{t2}=u_1 r_{21}+u_2 r_{22}$.

Step S303 (not shown in the figure): generating and output a target response based on the attribute information currently corresponding to the robot and the information to be responded corresponding to the current input of the user.

For the embodiment of the present disclosure, based on the attribute information currently corresponding to the robot and the information to be responded corresponding to the current input of the user, and by using the preset model, the target response is generated and output.

Figure 8:
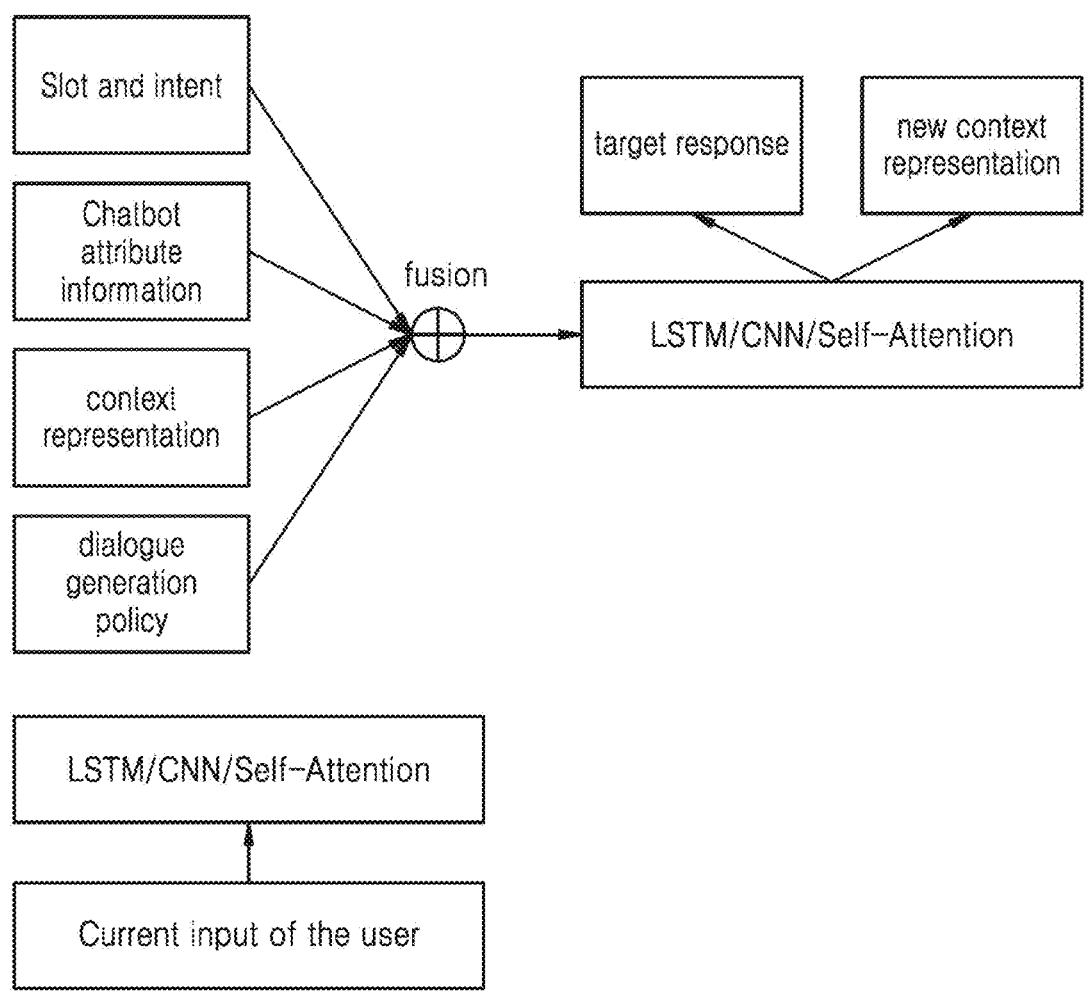
FIG. 8 is an NLG framework diagram based on an encoder-decoder model in an embodiment of the present disclosure.

Specifically, as shown in FIG. 8, the preset model may include: an encoder-decoder model, wherein the input data includes: a current input of a user, a response generation policy (dialogue policy distribution), a context representation, attribute information currently corresponding to the robot, and intent information, wherein the dialog generation policy is from the dialog management module, the intent is from the NLU module, and the chatbot data is from the chatbot individual database and/or the group database. The output layer of the model not only generates a dialog response (target response), but also generates a new context representation which will be used as the context representation for the input of the next encoder-decoder model.

Further, as shown in FIG. 8, the current user input is passed through the LSTM model, the CNN model, or the Self-Attention model to obtain corresponding text information, and the obtained corresponding text information, the dialog policy, the context representation, the chatbot data, the slot value and the intent are fused by the fusion model, and then the fused information is subjected to the LSTM model, the CNN model or the Self-Attention model again to obtain the target response and the context representation of the input of the next encoder-decoder model.

Wherein, the fusion module is mainly used to integrate utterance features, database features and dialogue content features, which may be integrated by the following formula:

$$h_m = \begin{bmatrix} h_x \\ 1 \end{bmatrix} \otimes \begin{bmatrix} h_y \\ 1 \end{bmatrix} \otimes \begin{bmatrix} h_z \\ 1 \end{bmatrix};$$

Wherein, $h_x$ represents the current input of the user, $h_y$ represents the context feature, $h_z$ represents the attribute information corresponding to chatbot, $h_m$ represents the tensor of the fusion of the three modal information $h_x$, $h_y$, $h_z$, and "1" represents the vector with all values of 1, considering the effect of the offset, the tensor is expanded in dimension; in the embodiment of the present disclosure, the fused feature may be a one-dimensional tensor or a multi-dimensional tensor.

Figure 9:
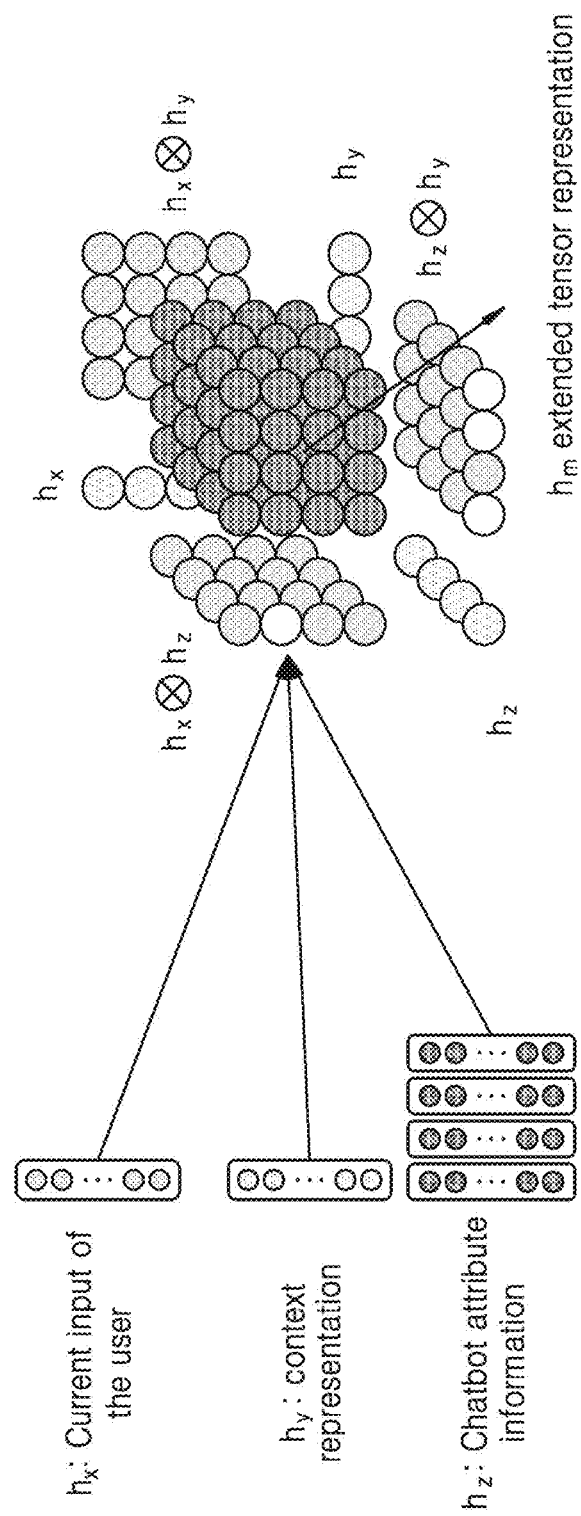
FIG. 9 is a schematic diagram of a fusion method based on tensor feature in an embodiment of the present disclosure.

Specifically, as shown in FIG. 9, $h_x$, $h_y$, and $h_z$ are fused to obtain an extended tensor feature $h_m$. The tensor fusion technology may realize the fusion of multi-modal information, and may effectively obtain multi-dimensional interaction information between multiple modalities, such as single modal information, interaction information between two modalities, and interaction information between three modalities. In practical applications, for avoiding complexity, only interaction information that does not exceed N=3 models (when N=1, there is no interaction at this time) is obtained. Finally, the tensor information of the fusion of various modalities is input together into the decoder network. The modal fusion information is independent of the fusion order of the modal information.

For the embodiment of the present disclosure, the slot value and knowledge extracted from the current input of the user according to the NLU may also be generated, and the target response is generated by using the template as shown in Table 1. The dialog policy network also determines whether it is necessary to use the template generation. If Yes, the template generation is used, otherwise the model generation is used.

TABLE 1

| Semantic framework | Natural language |
|---|---|
| Confirm(area = $W) | "Do you want somewhere in the $W" |
| Info(food = $V) | "Do you want to a $V restaurant" |
| Confirm(Food = $V, area = $W) | "Do you want a $V restaurant in the $W" |

In Table 1, $V and $W may represent the slot value to be filled, and $W represents that this is the information to be filled. The filled value is referred to as the slot value relative to the slot; for example, area="XXX", wherein 'area' indicates the slot, "XXX" is the slot value obtained according to the input, and the entire process is referred to as Slot filling.

In another possible implementation manner of the embodiment of the present disclosure, step S301 may specifically include: obtaining the attribute information currently corresponding to the robot according to at least one of the previous input of the user and the historical knowledge information, and the current input of the user.

Wherein, the historical knowledge information is historical interaction information between the user and the robot, and the historical knowledge information includes: entities in the historical dialogue information and relationship information between the entities.

For the embodiment of the present disclosure, the attribute information currently corresponding to the robot may be obtained according to the previous input of the user and the current input of the user; and the attribute information currently corresponding to the robot may be obtained according to the historical knowledge information and the current input of the user; the attribute information currently corresponding to the robot is obtained according to previous input of the user, the historical knowledge information and the current input of the user. It is not limited in the embodiment of the present disclosure.

In another possible implementation manner of the embodiment of the present disclosure, the determining the personality information corresponding to the current user based on the current input of the user, includes: determining probability distribution information of the user on each personality category based on the current input of the user; determining the personality information corresponding to the current user based on the probability distribution information of the user on each personality category.

In another possible implementation manner of the embodiment of the present disclosure, the determining the emotion information corresponding to the current user based on the current input of the user, includes: determining probability distribution information of the user on each emotion category based on the current input of the user; determining the emotion information corresponding to the current user based on the probability distribution information of the user on each emotion category.

EXAMPLE 2

Figure 4:
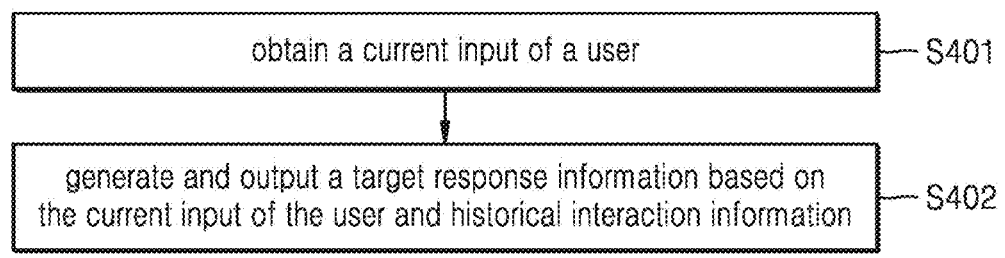
FIG. 4 is a schematic flowchart of another information processing method in an embodiment of the present disclosure.

The embodiment of the present disclosure introduces an information processing method. In this embodiment, a process of dialogue with a user may be performed according to current input of the user and based on historical knowledge information during the user interaction with the robot. Wherein, Example 2 may be implemented in combination with Example 1, or may be implemented separately. When Example 2 is implemented separately, the specific method flow is shown in FIG. 4, wherein, Step S401: obtaining a current input of a user.

For the embodiment of the present disclosure, the current input of the user may include information input by the user through a text format, and may also include information input by the user through a voice format. It is not limited in the embodiment of the present disclosure.

Step S402: generating and outputting target response information based on the current input of the user and the historical interaction information.

For the embodiment of the present disclosure, step S402 may specifically include:

obtaining historical knowledge information that matches the current input of the user; and generating and outputting the target response information based on the current input of the user and the historical knowledge information that matches the current input information of the user.

For the embodiment of the present disclosure, the historical knowledge information (history interaction information) that the user interacts with the robot includes: entities in the historical dialogue information and relationship information between the respective entities.

In the embodiment of the present disclosure, the historical knowledge information of the interaction of the user and the robot may be stored in a pre-constructed individual knowledge base. The embodiment of the present disclosure obtains the current input of the user, and determines the information such as the intent corresponding to the current input of the user based on the current input of the user, and obtains the historical knowledge information that matches the current input of the user from the individual knowledge base according to the information such as the intent corresponding to the current input. For example, if the current inputs of the user is "The game was very good yesterday", then the intent currently corresponding to the user is determined as "ball game" relevant information, and the historical knowledge information related to the "ball game" is obtained from the individual knowledge base. Of course, since each piece of historical knowledge information in the individual knowledge base has a time stamp corresponding thereto, the time information may be combined when obtaining the historical knowledge information corresponding to the current input.

In another possible implementation manner of the embodiment of the present disclosure, after generating and outputting the target response information, further includes:

extracting key information from the current input of the user and the target response information by using a preset processing manner, and storing key information in a form of knowledge representation;

Wherein, the preset processing manner includes at least one of the following:

entity recognition; relation extraction; event extraction; noise reduction processing.

There are many mature methods available for the entity recognition and the relation extraction. For example, the entity recognition may be obtained by deep learning-based sequence labelling method, such as bidirectional neural network (Bi-LSTM); relation extraction is obtained by relation classification on the basis of the entity recognition; or may simultaneously perform entity recognition and relation extraction by directly using an entity and relation classification joint learning method, such as a CoType method, and a Table Representation method. The event extraction mainly extracts the event information mentioned in the dialogue, which consists of entity information related to the event, for example, a basketball game, the event information includes "team", "match time", "score", "address of the match" and other information which may also be obtained by using the sequence labelling method. The extracted information always has some errors or redundant information and needs further noise reduction processing.

Figure 5A:
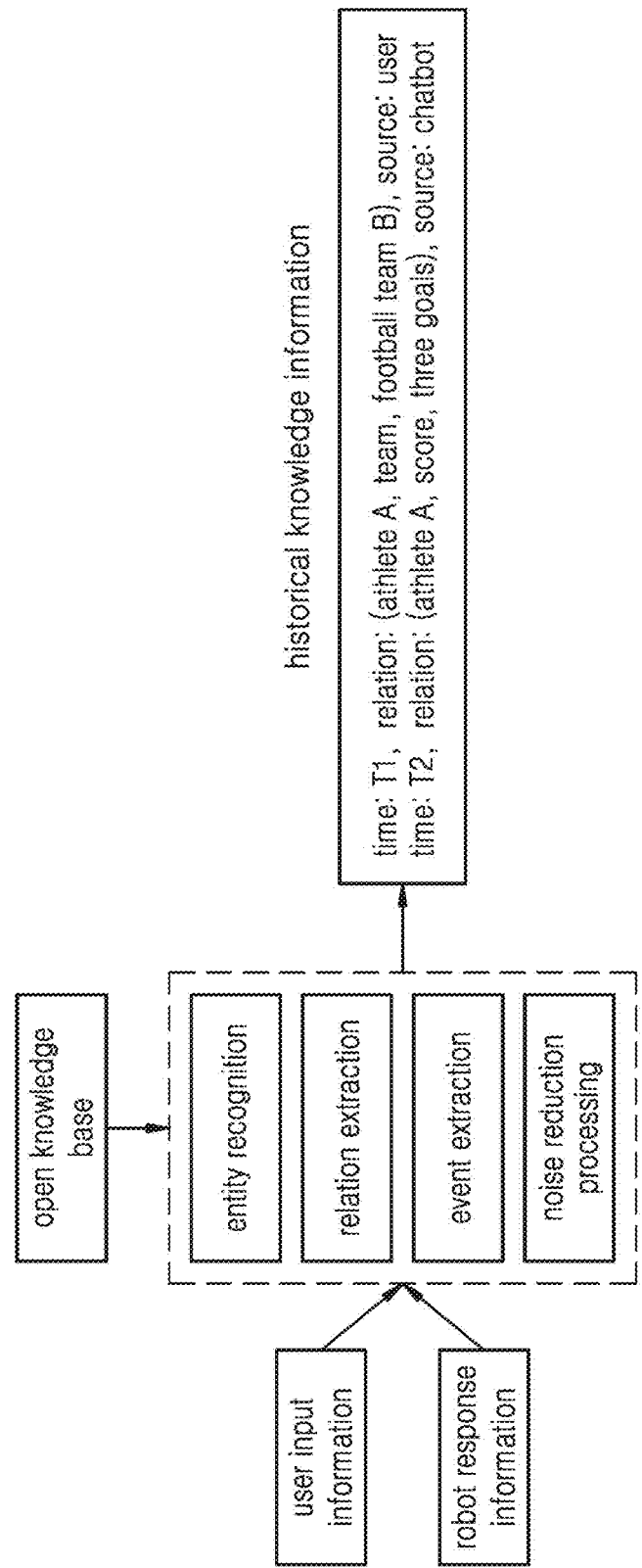
FIG. 5A is a schematic diagram of extracting historical knowledge from a historical dialogue in an embodiment of the present disclosure.

Specifically, as shown in FIG. 5A, the intent information is extracted from the historical dialogue (user input information and robot response information), including intent, slot filling information, and then in combination with the open database, and through entity recognition, relation extraction; event extraction and noise reduction processing, etc., to obtain the historical knowledge information, such as "Time: T1, Relation: (Athlete A, team, football team B), source: user", "Time: T2, Relation: (Athlete A, score, 3 balls), source: Chatbot", and store historical knowledge information in an individual knowledge base.

Figure 5B:
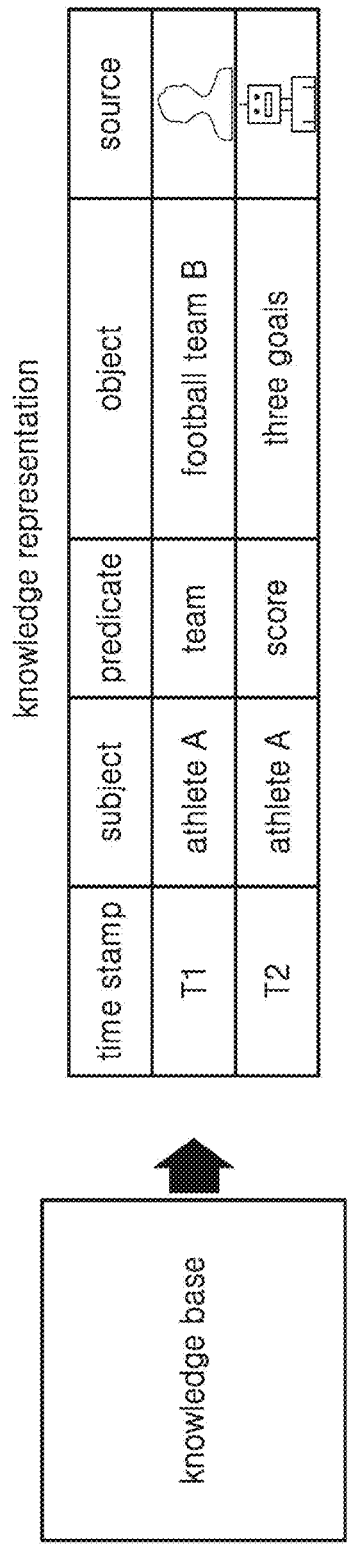
FIG. 5B is an exemplary diagram of storing historical knowledge information in an individual database in the embodiment of the present disclosure.

For the embodiment of the present disclosure, the individual knowledge base records the key information in the dialogue between the user and the Chatbot through the form of the knowledge representation, for example, "Time: T1, Relation: (Athlete A, Team, Football Team B), Source: User" and "Time: T2, Relation: (Athlete A, Score, 3 balls), Source: Chatbot" is stored in the individual knowledge base through the form of the knowledge representation, as shown in FIG. 5B.

An embodiment of the present disclosure provides an information processing method. Compared with the prior art, the embodiment of the present disclosure obtains a current input of a user, and then generates and outputs target response information based on the current input of the user and historical knowledge information of the interaction of the user and the robot. That is, the target response information outputted in the embodiment of the present disclosure is generated based on the current input of the user and the historical knowledge information of the interaction of the user and the robot, and is not only generated according to the current input of the user, thereby improving the accuracy of the target response information output by the robot, which may enhance the user experience.

Figure 13:
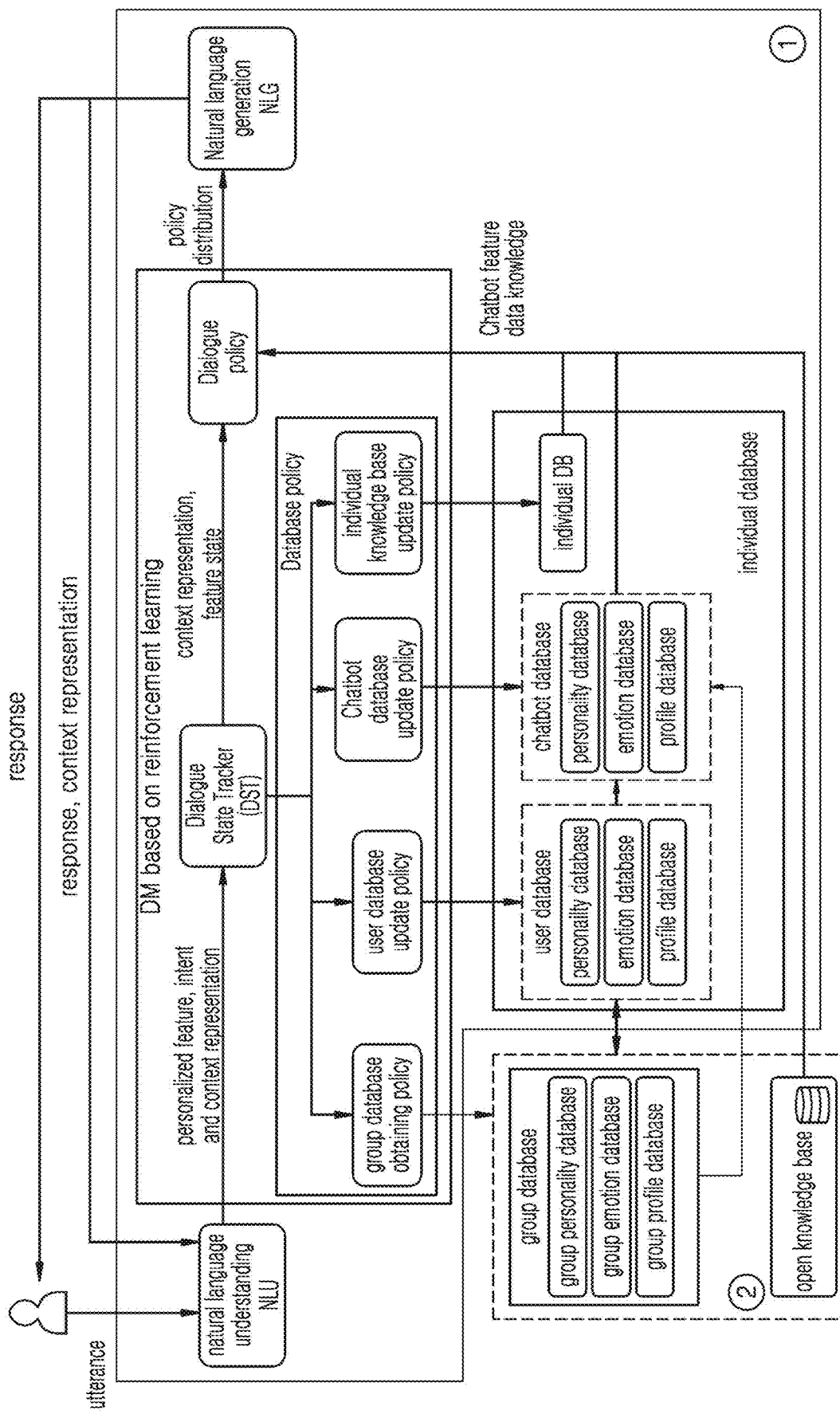
FIG. 13 is a schematic structural diagram of another actively growing chatbot provided by an embodiment of the present disclosure.

On the basis of the above embodiments, the way of the dialogue between the user and chatbot is summarized in a summary manner. As shown in FIG. 13, the architecture mainly includes four modules: natural language understanding (NLU), dialogue management (DM), individual database and group database (including open knowledge base)

and natural language generation (NLG). The architecture supports cloud-side deployment and also supports on-device deployment.

Natural Language Understanding (NLU) is mainly used to analyze the sentence text in the dialogue. The function includes extracting the user's intent, personality features, emotion features, profiles and individual knowledge contained in the dialogue, and predicting the attribute features of the chat objects that the user may like. The input information is the user's current input (user utterance p) and the previous chatbot response q, and the historical context representation generated by the NLG. User personalized feature extraction and individual knowledge extraction mainly rely on the user utterance and historical context representation, but in addition to the above information, the prediction of the chatbot attribute information that the user may like may need to use the response text of the previous chatbot response.

Dialogue Management (DM) mainly includes the following three parts:
1) Dialogue State Tracking (DST), which records the intermediate state of the information obtained by the system from the NLU module, such as user intent, the distribution variation of the reliability value of Slot filling, the representation of the dialogue history context, and the representation of current utterance (representation vector corresponding to the current input of the user), etc., for generation of the dialog policy and database update policy.
2) Dialogue Policy, which generates a probability distribution P(a|s) of all possible responses, wherein s is the current input state (including DST information and Chatbot personalized information), and a is also referred to as action, representing a possible response generated. Since the response may be a sentence of any length, the state space of a is infinite.
3) DB Policy, including four policies: (1) user database update policy, which is used to determine whether it is necessary to update the user individual database; (2) Chatbot database update policy, which is used to determine whether it is necessary to update Chatbot individual database, (3) group database obtaining policy, which is used to determine whether it is necessary to obtain the chatbot personalization information from the group database in order to update the chatbot individual database; (4) individual knowledge base update policy, which is used to determine whether it is necessary to update the individual knowledge base, wherein the individual knowledge is from the NLU to extract the entire dialogue text.

Natural Language Generation (NLG), which is a text generation module for dialogue responses, here employs template-based generation method and neural network generation method. The input information of the module includes a probability distribution of the dialogue response obtained according to the dialog policy, a context representation of the dialogue text, and personalized feature information obtained from the Chatbot database and the individual knowledge base.

Figure 15:
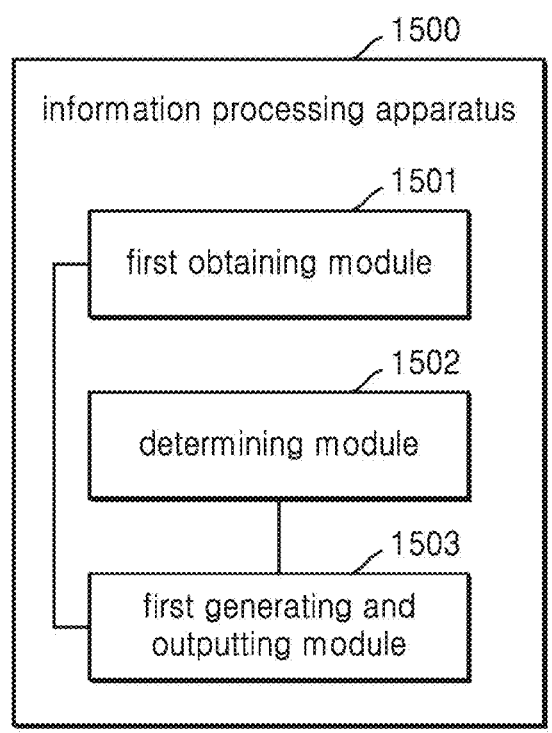
FIG. 15 is a schematic structural diagram of an information processing apparatus in an embodiment of the present disclosure.

The above embodiment introduces the method for the user to talk with Chatbot from the perspective of the method flow. The following describes the perspective of the virtual module, as follows:

An embodiment of the present disclosure provides an information processing apparatus. As shown in FIG. 15, the apparatus 1500 may include: a first obtaining module 1501, a determining module 1502, and a first generating and outputting module 1503, wherein, The first obtaining module 1501 is configured to obtain the attribute information currently corresponding to the information responding party according to the current input of the user.

The determining module 1502 is configured to determine information to be responded corresponding to the current input of the user.

The first generating and outputting module 1503 is configured to generate and output a target response based on the attribute information currently corresponding to the information responding party obtained by the first obtaining module 1501 and the information to be responded corresponding to the current input of the user determined by the determining module 1502.

In a possible implementation manner of the embodiment of the present disclosure, the attribute information currently corresponding to the information responding party includes at least one of the following:

personality information; emotion information; profile information;

The profile information includes at least one of the following: gender, age, weight, height, place of birth, occupation, education background, and hobby.

In another possible implementation manner of the embodiment of the present disclosure, the first obtaining module is specifically configured to obtain attribute information currently corresponding to the information responding party according to the current input of the user and the historical interaction information.

Wherein, the historical interaction information includes: historical interaction event information obtained from historical dialogue information.

In another possible implementation manner of the embodiment of the present disclosure, the first obtaining module 1501 is specifically configured to determine the attribute information currently corresponding to the information responding party as the information responding party attribute information corresponding to the previous user input if determining not to update the information responding party database according to the current input of the user; and/or The first obtaining module 1501 includes: an updating unit and a first obtaining unit, wherein, The updating unit is configured to update the information responding party database according to the current input of the user if determining to update the information responding party database according to the current input of the user.

The first obtaining unit is configured to obtain the attribute information currently corresponding to the information responding party from the updated information responding party database.

In another possible implementation manner of the embodiment of the present disclosure, the updating unit includes: a determining subunit and an updating subunit, wherein, The determining subunit is configured to determine predicted attribute information corresponding to the information responding party according to a current input of a user;

The update subunit is configured to update the information responding party database based on the predicted attribute information corresponding to the information responding party.

In another possible implementation manner of the embodiment of the present disclosure, the determining subunit is specifically configured to determine attribute information currently corresponding to the user according to a current input of the user;

The determining subunit is specifically configured to determine the predicted attribute information corresponding to the information responding party according to the attribute information currently corresponding to the user.

In another possible implementation manner of the embodiment of the present disclosure, the determining subunit is specifically configured to determine user attribute information corresponding to the current input;

The determining subunit is specifically configured to determine the attribute information currently corresponding to the user based on the user attribute information corresponding to the current input and the user attribute information stored in the user database.

In another possible implementation manner of the embodiment of the present disclosure, the determining subunit is specifically configured to determine similar attribute information corresponding thereto based on the attribute information currently corresponding to the user;

The determining subunit is specifically configured to determine the predicted attribute information corresponding to the information responding party based on the determined similar attribute information corresponding thereto.

In another possible implementation manner of the embodiment of the present disclosure, the first obtaining unit is specifically configured to obtain the updated information responding party attribute information from the updated information responding party database as the attribute information currently corresponding to the information responding party.

In another possible implementation manner of the embodiment of the present disclosure, the attribute information currently corresponding to the user includes at least one of the following:

personality information; emotion information; profile information;

The profile information includes at least one of the following: gender, age, weight, height, place of birth, occupation, education background, and hobby.

In another possible implementation manner of the embodiment of the present disclosure, when determining the personality information corresponding to the current user based on the current input of the user, the determining subunit is specifically configured to determine the probability distribution information of the user on each personality category based on the current input of the user, and determine the personality information corresponding to the current user based on the probability distribution information of the user on each personality category; and/or, When determining the emotion information corresponding to the current user based on the current input of the user, the determining submodule is specifically configured to determine the probability distribution information of the current user on each emotion category based on the current input of the user, and determining the emotion information corresponding to the current user based on the probability distribution information of the user on each emotion category.

The embodiment of the present disclosure provides an information processing method. Compared with the prior art, the embodiment of the present disclosure obtains the attribute information currently corresponding to the information responding party according to the current input of the user, and then determines the information to be responded corresponding to the current input of the user, and then generates and outputs the target response based on the attribute information currently corresponding to the information responding party and the information to be responded corresponding to the current input of the user. That is, the target response outputted in the embodiment of the present disclosure is generated based on the attribute information currently corresponding to the information responding party, and the attribute information currently corresponding to the information responding party is determined based on the current input of the user, thereby the accuracy of the target response information output by the information responding party (including the intelligent chatbot) may be improved, and improving the user experience.

The embodiments of the present disclosure are applicable to the foregoing method embodiments, and are not described herein again.

Figure 16:
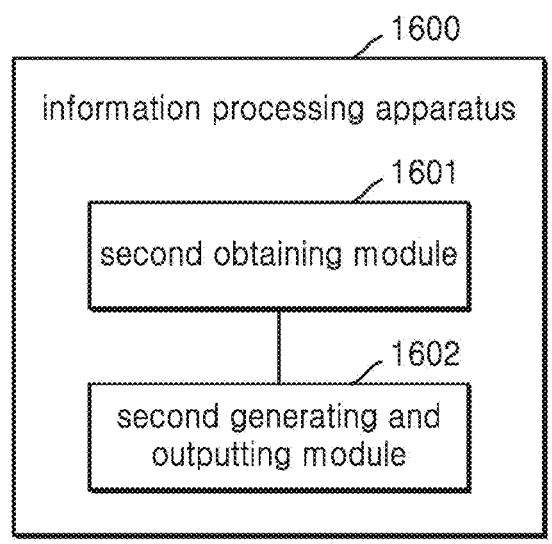
FIG. 16 is a schematic structural diagram of another information processing apparatus in an embodiment of the present disclosure.

The embodiment of the present disclosure provides another information processing apparatus, as shown in FIG. 16, wherein the apparatus 1600 may include: a second obtaining module 1601, and a second generating and outputting module 1602, wherein, The second obtaining module 1601 is configured to obtain a current input of a user.

The second generating and outputting module 1602 is configured to generate and output target response information based on the current input of the user and the historical interaction information.

In another possible implementation manner of the embodiment of the present disclosure, the second generating and outputting module 1602 includes: a second obtaining unit and a generating and outputting unit, wherein, a second obtaining unit is configured to obtain historical interaction information that matches a current input of the user;

a generating and outputting unit is configured to generate and output target response information based on current input information of the user and historical interaction information that matches the current input information of the user;

Wherein, the historical interaction information includes: historical interaction event information obtained from historical dialogue information.

In another possible implementation manner of the embodiment of the present disclosure, the apparatus 1600 further includes: an extraction module and a storage module, wherein, The extraction module is configured to extract key information from the current input of the user and the target response information by using a preset processing manner;

The storage module is configured to store key information extracted by the extraction module;

Wherein, the preset processing manner includes at least one of the following:

entity recognition; relationship extraction; event extraction; noise reduction processing.

The embodiment of the present disclosure provides an information processing apparatus. Compared with the prior art, the embodiment of the present disclosure obtains the current input of the user, and then generates and outputs a target response based on the current input of the user and the historical knowledge information of the interaction between the user and the information responding party. That is, the target response information outputted in the embodiment of the present disclosure is generated based on the current input of the user and the historical knowledge information of the interaction between the user and the information responding party, and is not only generated according to the current input of the user, thereby improving the accuracy of the target response information output by the information responding party (including the intelligent chatbot) may be improved, and improving the user experience.

The information processing apparatus provided in the embodiment of the present disclosure is applicable to the foregoing method embodiments, and details are not described herein again.

The information processing apparatus provided by the embodiment of the present disclosure is introduced from the perspective of functional modularization. Then, the electronic device provided by the embodiment of the present disclosure will be introduced from the perspective of hardware materialization, and the computing system of the electronic device will be introduced at the same time.

Figure 17:
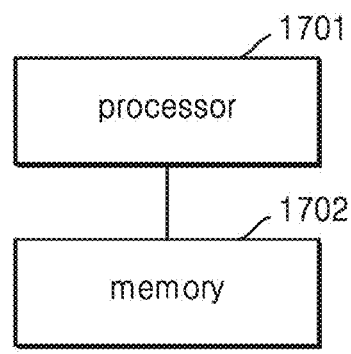
FIG. 17 is a schematic structural diagram of an electronic device in an embodiment of the present disclosure.

The embodiment of the present disclosure provides an electronic device, which is applicable to the foregoing method embodiment, as shown in FIG. 17, including: a processor 1701 and a memory 1702, the memory 1702 is configured to store machine readable instructions, when the instructions is executed by the processor 1701, cause the processor 1701 to execute the above information processing method.

Figure 18:
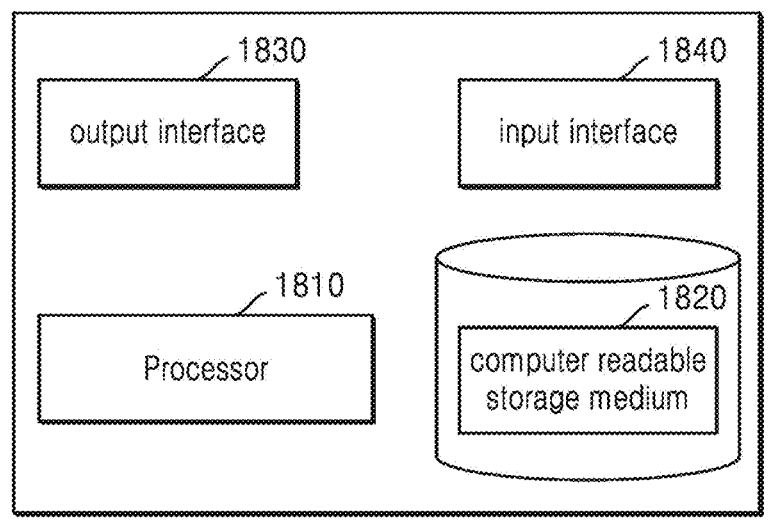
FIG. 18 is a block diagram of a computing system that can be used to implement the electronic device of the present disclosure in an embodiment of the present disclosure.

FIG. 18 schematically illustrates a block diagram of a computing system that can be used to implement the electronic device of the present disclosure, in accordance with an embodiment of the present disclosure. As shown in FIG. 18, the computing system 1800 includes a processor 1810, a computer readable storage medium 1820, an output interface 1830, and an input interface 1840. The computing system 1800 may perform the method described above with respect to FIG. 3 or FIG. 4 to implement device control instructions based on user input to control at least one target device to perform corresponding operations. In particular, the processor 1810 may include, for example, a general-purpose microprocessor, an instruction set processor, and/or a related chipset and/or a special purpose microprocessor (e.g., an application specific integrated circuit (ASIC)), and the like. The processor 1810 may also include onboard memory for caching purposes. The processor 1810 may be a single processing unit or a plurality of processing units for performing different actions of the method flow described with reference to FIG. 3 or FIG. 4.

The computer readable storage medium 1820, for example, may be any medium that may contain, store, communicate, propagate, or transport the instructions. For example, the readable storage medium may include, but is not limited to, an electronic, magnetic, optical, electromagnetic, infrared, or semiconductor system, apparatus, device, or propagation medium. Specific examples of the readable storage medium include: a magnetic storage apparatus such as a magnetic tape or a hard disk (HDD); an optical storage apparatus such as a compact disk (CD-ROM); a memory such as a random access memory (RAM) or a flash memory; and/or a wired/wireless communication link.

The computer readable storage medium 1820 may include a computer program 1821, which may include codes/computer executable instructions that, when executed by the processor 1810, cause the processor 1810 to perform, for example, the method flow described above in connection with FIG. 3 or FIG. 4 and any variations thereof. The computer program 1821 may be configured to have for example, computer program codes including a computer program module. For example, in an example embodiment, the codes in the computer program 1821 may include one or more program modules, for example, module 1821A, module 1821B, . . . . It should be noted that the division manner and the number of modules is not fixed, and those skilled in the art may use suitable program modules or program module combinations according to actual situations. When executed by the processor 1810, these program module combinations cause the processor 1810 may perform, for example, the method flow described above in connection with FIG. 3 or FIG. 4 and any variations thereof.

According to an embodiment of the present disclosure, the processor 1810 may use the output interface 1830 and the input interface 1840 to perform the method flow described above in connection with FIG. 3 or FIG. 4 and any variations thereof.

The embodiment of the present disclosure provides an electronic device. Compared with the prior art, the embodiment of the present disclosure obtains the attribute information currently corresponding to the information responding party according to the current input of the user, and then determines the information to be responded corresponding to the current input of the user, and then generates and outputs the target response based on the attribute information currently corresponding to the information responding party and the information to be responded corresponding to the current input of the user. That is, the target response outputted in the embodiment of the present disclosure is generated based on the attribute information currently corresponding to the information responding party, and the attribute information currently corresponding to the information responding party is determined based on the current input of the user, thereby the accuracy of the target response information output by the information responding party (including the intelligent chatbot) may be improved, and improving the user experience.

The embodiment of the present disclosure provides an electronic device. Compared with the prior art, the embodiment of the present disclosure obtains the current input of the user, and then generates and outputs a target response based on the current input of the user and the historical knowledge information of the interaction between the user and the information responding party. That is, the target response information outputted in the embodiment of the present disclosure is generated based on the current input of the user and the historical knowledge information of the interaction between the user and the information responding party, and is not only generated according to the current input of the user, thereby improving the accuracy of the target response information output by the information responding party (including the intelligent chatbot) may be improved, and improving the user experience.

The computing system of the electronic device and the electronic device provided by the embodiment of the present disclosure is applicable to the foregoing method embodiments, and details are not described herein again.

For the embodiments of the present disclosure, the explanations of the same or similar terms in the respective embodiments may be referred to each other, and are not separately described in the respective embodiments.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other orders. Moreover, at least some of the steps in the flowchart of the drawings may include a plurality of sub-steps or stages, which are not necessarily performed at the same time, but may be executed at different times, and the execution order thereof does not need to be performed sequentially, but may be performed alternately or alternately with at least a portion of other steps or sub-steps or stages of other steps.

The above is only a part of the embodiments of the present disclosure, and it should be noted that those skilled in the art may also make several improvements and retouchings without departing from the principles of the present disclosure. It should be considered as the scope of protection of the present disclosure.

The invention claimed is:

1. An information processing method comprising:
   obtaining attribute information currently corresponding to an information responding party based on a current input of a user;
   determining information to be responded corresponding to the current input of the user; and
   generating and outputting a target response based on the attribute information currently corresponding to the information responding party and the information to be responded corresponding to the current input of the user,
   wherein the attribute information includes at least one of personality information, emotion information, and profile information,
   wherein the personality information is obtained based on probability distribution information of the user on a personality category,
   wherein the emotion information is obtained based on probability distribution information of the user on an emotion category,
   wherein the personality information is characterized by a first feature vector,
   wherein the emotion information is characterized by a second feature vector,
   wherein the personality information is stored in a personality database,
   wherein a construction of the personality database defines a personality database template,
   wherein the personality database template is composed of a plurality of categories to form a coordinate base of the personality database, and
   wherein the plurality of categories are summarized based on behavioral psychology.

2. The method according to claim 1,
   wherein obtaining the attribute information currently corresponding to the information responding party according to the current input of the user comprises:
      obtaining attribute information currently corresponding to the information responding party based on the current input of the user and historical interaction information; and
   wherein the historical interaction information comprises:
      historical interaction event information obtained from historical dialogue information.

3. The method according to claim 1, wherein obtaining the attribute information currently corresponding to the information responding party according to the current input of the user comprises at least one of the following:
   if it is determined that an information responding party database is not updated based on the current input of the user, determining that the attribute information currently corresponding to the information responding party is the information responding party attribute information corresponding to a previous user input; or
   if it is determined to update the information responding party database based on the current input of the user, updating the information responding party database based on the current input of the user, and obtaining the attribute information currently corresponding to the information responding party from the updated information responding party database.

4. The method according to claim 3, wherein updating the information responding party database based on the current input of the user comprises:
   determining predicted attribute information corresponding to the information responding party based on the current input of the user; and
   updating the information responding party database based on the predicted attribute information corresponding to the information responding party.

5. The method according to claim 4, wherein determining the predicted attribute information corresponding to the information responding party based on the current input of the user comprises:
   determining attribute information currently corresponding to the user based on the current input of the user; and
   determining the predicted attribute information corresponding to the information responding party according to the attribute information currently corresponding to the user.

6. The method according to claim 5, wherein determining the attribute information currently corresponding to the user based on the current input of the user comprises:
   determining user attribute information corresponding to the current input; and
   determining the attribute information currently corresponding to the user based on the user attribute information corresponding to the current input and user attribute information stored in a user database.

7. The method according to claim 5, wherein determining the predicted attribute information corresponding to the information responding party according to the attribute information currently corresponding to the user comprises:
   determining similar attribute information corresponding to the attribute information currently corresponding to the user based on the attribute information currently corresponding to the user; and
   determining the predicted attribute information corresponding to the information responding party based on the determined similar attribute information corresponding thereto.

8. The method according to claim 3, wherein obtaining the attribute information currently corresponding to the information responding party from the updated information responding party database comprises:
   obtaining updated information responding party attribute information from the updated information responding party database as the attribute information currently corresponding to the information responding party.

9. The method according to claim 3, wherein obtaining the attribute information currently corresponding to the information responding party from the updated information responding party database comprises:
   when the updated information responding party attribute information from the updated information responding party database is incomplete, supplementing the attribute information currently corresponding to the information responding party with attribute information from group database.

10. The method according to claim 6, wherein determining the attribute information currently corresponding to the user based on the user attribute information corresponding to the current input and the user attribute information stored in the user database comprises:

when the user attribute information stored in the user database is incomplete, supplementing the attribute information currently corresponding to the user with attribute information from group database.

11. An information processing apparatus comprising:
a memory configured to store one or more instructions; and
at least one processor configured to execute the one or more instructions stored in the memory to:
obtain attribute information currently corresponding to an information responding party based on a current input of a user,
determine information to be responded corresponding to the current input of the user, and
generate and output a target response based on the attribute information currently corresponding to the information responding party and the information to be responded corresponding to the current input of the user,
wherein the attribute information includes at least one of personality information, emotion information, and profile information,
wherein the personality information is obtained based on probability distribution information of the user on a personality category,
wherein the emotion information is obtained based on probability distribution information of the user on an emotion category,
wherein the personality information is characterized by a first feature vector,
wherein the emotion information is characterized by a second feature vector,
wherein the personality information is stored in a personality database,
wherein a construction of the personality database defines a personality database template,
wherein the personality database template is composed of a plurality of categories to form a coordinate base of the personality database, and
wherein the plurality of categories are summarized based on behavioral psychology.

12. A computer readable storage medium, wherein the readable storage medium stores a computer program, the computer program being executed by a processor to implement the method of claim 1.

13. A computer readable storage medium, wherein the readable storage medium stores a computer program, the computer program being executed by a processor to implement the method of claim 2.

14. A computer readable storage medium, wherein the readable storage medium stores a computer program, the computer program being executed by a processor to implement the method of claim 3.

15. A computer readable storage medium, wherein the readable storage medium stores a computer program, the computer program being executed by a processor to implement the method of claim 4.

16. A computer readable storage medium, wherein the readable storage medium stores a computer program, the computer program being executed by a processor to implement the method of claim 5.

17. A computer readable storage medium, wherein the readable storage medium stores a computer program, the computer program being executed by a processor to implement the method of claim 6.

18. A computer readable storage medium, wherein the readable storage medium stores a computer program, the computer program being executed by a processor to implement the method of claim 7.

19. A computer readable storage medium, wherein the readable storage medium stores a computer program, the computer program being executed by a processor to implement the method of claim 9.

20. A computer readable storage medium, wherein the readable storage medium stores a computer program, the computer program being executed by a processor to implement the method of claim 10.

* * * * *